(12) United States Patent
Schmidt

(10) Patent No.: US 10,296,865 B2
(45) Date of Patent: May 21, 2019

(54) SYSTEM AND METHOD OF CODE-BASED SHIPPING

(71) Applicant: Peter Oliver Schmidt, Washington, DC (US)

(72) Inventor: Peter Oliver Schmidt, Washington, DC (US)

( * ) Notice: Subject to any disclaimer, the term of this patent is extended or adjusted under 35 U.S.C. 154(b) by 260 days.

(21) Appl. No.: 15/009,287

(22) Filed: Jan. 28, 2016

(65) Prior Publication Data

US 2017/0220976 A1   Aug. 3, 2017

(51) Int. Cl.
  *G06Q 10/08*    (2012.01)

(52) U.S. Cl.
  CPC ................... *G06Q 10/083* (2013.01)

(58) Field of Classification Search
  CPC ... G06Q 10/083; G06K 7/1413; B07C 5/3412
  USPC .......................................................... 283/81
  See application file for complete search history.

(56) References Cited

U.S. PATENT DOCUMENTS

| | | | |
|---|---|---|---|
| 3,989,574 A | 11/1976 | Evans | |
| 4,832,204 A | 5/1989 | Handy | |
| 5,038,283 A | 8/1991 | Caveney | |
| 5,238,099 A | 8/1993 | Schroeder | |
| 6,015,167 A | 1/2000 | Savino | |
| 6,189,784 B1 | 2/2001 | Williams | |
| 6,260,029 B1 | 7/2001 | Critelli | |
| 6,525,835 B1 | 2/2003 | Gulati | |
| 6,690,997 B2 * | 2/2004 | Rivalto | G06Q 10/08 700/237 |
| 6,783,063 B2 * | 8/2004 | Holden | B07C 3/18 235/379 |
| 6,882,269 B2 * | 4/2005 | Moreno | A47G 29/141 235/383 |
| 6,895,241 B2 | 5/2005 | Hara | |
| 7,164,359 B2 | 1/2007 | Waterhouse | |
| 7,346,591 B2 | 3/2008 | Sansone | |
| 7,853,481 B1 * | 12/2010 | Johnson | G06Q 10/08 705/26.42 |
| 9,016,559 B2 * | 4/2015 | Gillen | G06Q 10/083 235/375 |
| 9,043,237 B2 | 5/2015 | McCarthy | |
| 9,082,247 B2 * | 7/2015 | Turner | G07F 7/00 |
| 9,110,608 B2 | 8/2015 | Schultz | |
| 9,213,972 B2 | 12/2015 | Dorso | |
| 9,436,770 B2 * | 9/2016 | Hattrup | G06Q 50/28 |
| 9,836,715 B2 * | 12/2017 | Gillen | G06Q 10/083 |
| 2003/0155422 A1 | 8/2003 | Kawakami | |
| 2007/0215685 A1 | 9/2007 | Self | |
| 2010/0084470 A1 | 4/2010 | Scott | |
| 2013/0117646 A1 | 5/2013 | Hansen | |
| 2013/0211939 A1 | 8/2013 | Katira | |
| 2014/0014714 A1 | 1/2014 | Tang | |

(Continued)

*Primary Examiner* — Joshua T Kennedy

(57) ABSTRACT

A system and method for shipping an item is presented that reduces the number of steps involved in the physical process and protects shipper and recipient privacy. The shipper is not required to label a package with the shipper's name or address, the recipient's name or address, or proof of payment. Instead the shipper scans a barcode on the package that encodes a package identifier, and causes a recipient identifier and payment information to be associated with the package identifier in a database. The recipient then causes his or her address to be associated with the recipient identifier.

20 Claims, 34 Drawing Sheets

(56) References Cited

U.S. PATENT DOCUMENTS

| | | |
|---|---|---|
| 2014/0074746 A1 | 3/2014 | Wang |
| 2016/0140486 A1* | 5/2016 | Tibbs .................. G06Q 10/083 |
| | | 705/330 |
| 2017/0220982 A1* | 8/2017 | Gillen .................. G06Q 10/083 |

* cited by examiner

FIG. 6a

My account

Username 36

@jdoe

Password 37

***** email 38 jdoe@email.com
39
■ Keep me updated by email
40

Phone (999) 999-9999
41
☐ Keep me updated by text
42

*(continued)*

My account

Preferred address for couriers

John Doe

350 Jay St #1, Brooklyn, NY 11201

43    44

Preferred dropoff locations

1.  [–] SnapShip Times Sq
   1541 Broadway, New York, NY 10036
2.  [+]

Preferred pickup locations

1.  [–] SnapShip Brooklyn
   300 Jay St, Brooklyn, NY 11201
2.  [+]

*(continued)*

FIG. 6c
*(continued)*

My account

Saved payment info  49

** -  - ** - 9999    VISA

| 09/20 | *** | 11201 |

50    51   52

When I get a package with courier delivery,

- Ask shipper for address (default)
- ○ Deliver to my preferred address
- ○ Ask me for addr. (you may pay more)

↳53

When I get a package for self pickup,

- Ask shipper for location (default)
- ○ Deliver to my preferred locations and if none available, ask shipper
- ○ Deliver to my preferred locations and if none available, ask me
- ○ Ask me for loc'n (you may pay more)

↳54

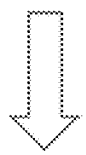

*(continued)*

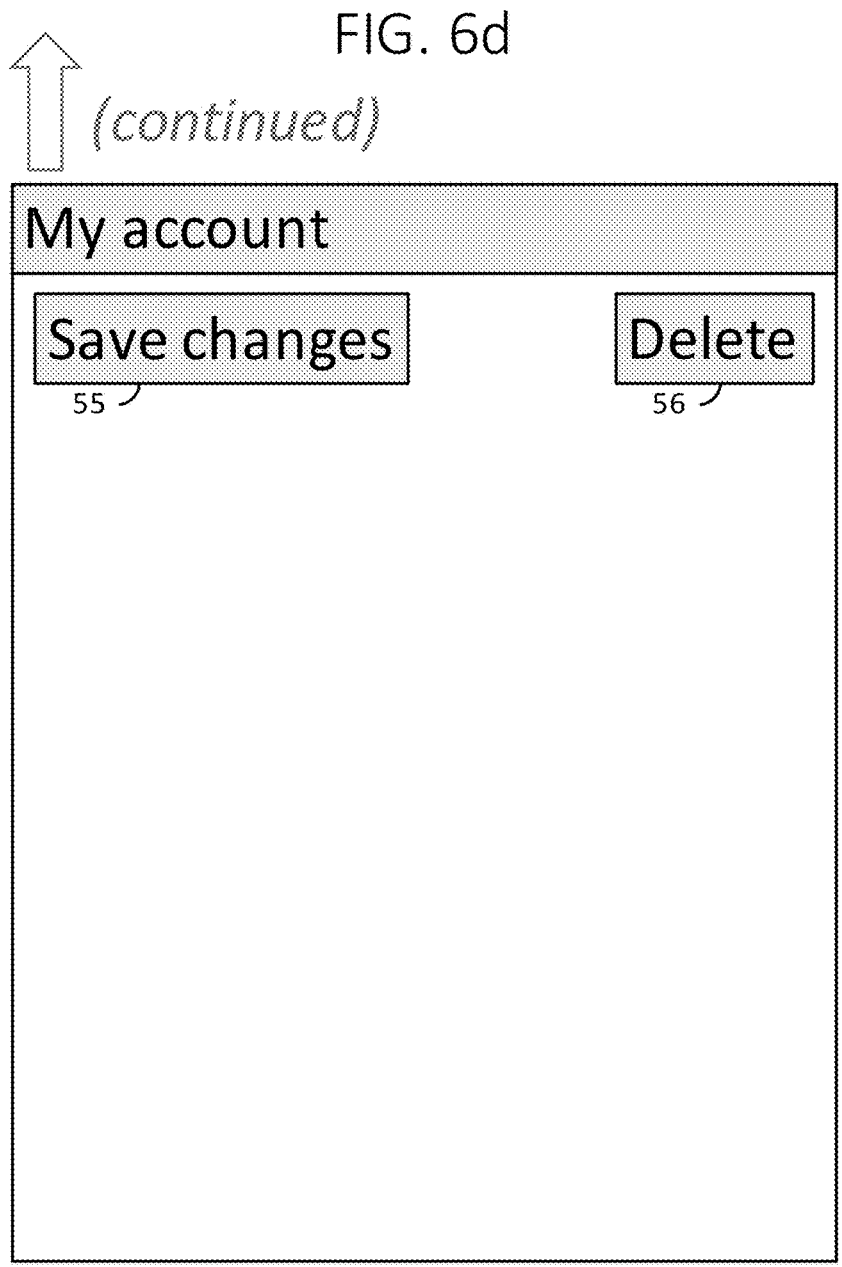

My account

Preferred address for couriers

John Doe

350 J

350 Jay St, Brooklyn, NY
350 Jackson Ave, Long Island City, NY
350 Jackson St, Brooklyn, NY
350 Jackson Pl, Brooklyn, NY 1. [−] SnapShip Times Sq
   1541 Broadway, New York, NY 10036
2. [+]

Preferred pickup locations

1. [−] SnapShip Brooklyn
   300 Jay St, Brooklyn, NY 11201
2. [+]

*(continued)*

| Employee account |
|---|
| Username |
| @asmith.shipper  71 [H][L] |
| 65 |
| Password |
| ***** [H][L] |
| 66 |
| email  67 |
| jdoe@email.com [H][L] |
| ■ Keep me updated by email [H][L] |
| 68 |
| Phone  69 |
| (999) 999-9999 [H][L] |
| ☐ Keep me updated by text [H][L] |
| 70 |

Ship

How will you get the package to SnapShip?

Courier will pick up from...

1. John Doe
   350 Jay St #1, Brooklyn, NY 11201 ⤴ 86

[Choose other address] ⤴ 87

———— OR ————

I will drop off at... 88

1. [Full] SnapShip Times Sq
   1541 Broadway, New York, NY 10036
2. SnapShip Midtown
   350 5th Ave, New York, NY 10118 ⤴ 89

[Choose other location] ⤴ 90

FIG. 26

| Additional fees | |
|---|---|
| Total price | |
| • Add courier dropoff to you | $ 1.00 |
| • Insurance | declined |
| Total | $ 1.00 |

↳ 124

How will you pay?

**__**_9999   VISA
↳ 125

Choose other card
↳ 126

FIG. 27

Present for Bill Smith

From @jdoe

*In transit* to
    SnapShip Brooklyn
    300 Jay St, Brooklyn, NY 11201
127

128
| Change destination/pickup method |

Tracking history

Scanned 08/31/16 9:06p in Greenbelt, MD
Scanned 08/31/16 3:41p in Washington, DC
Shipment created 08/31/16 1:00p in Washington, DC
129

*(continued)*

| Samples | |
|---|---|
| Total paid | |
| • Packaging (12"x12"x12" box) | $ 2.50 |
| • Distance surcharge | $ 1.00 |
| • Courier pickup from you | $ 2.50 |
| • Courier dropoff to @bsmith | $ 1.00 |
| • Insurance | declined |
| Total | $ 7.00 |

138

Paid with

**--**-9999   VISA

139

SYSTEM AND METHOD OF CODE-BASED SHIPPING

CROSS-REFERENCE TO RELATED APPLICATIONS

Not Applicable

BACKGROUND OF THE INVENTION

The field of the invention is item shipping, in particular, technological solutions for item shipping.

Recent years have seen a large growth in the shipping of items, whether by the U.S. Postal Service ("USPS"), The United Parcel Service ("UPS"), FedEx, or other companies such as local courier services. As businesses become more and more interstate and international, people move further and further from home, and ecommerce grows, the shipping of items is likely to increase even more. However, despite the growth of item shipping, it currently requires a shipper to engage in a large number of steps. A shipper must:
(1) obtain packaging;
(2) put the item to be shipped in the packaging;
(3) close and secure the packaging (e.g., using shipping tape);
(4) obtain the recipient's address;
(5) create a label with the recipient's address;
(6) pay;
(7) obtain proof of payment (e.g., a stamp);
(8) affix the label and proof of payment to the packaging; and
(9) drop the package off at a drop off point, such as a post office.

In recent years, web and smartphone apps have greatly increased the efficiency of a number of types of transactions. Apps such as PayPal and Venmo allow users to send money to a recipient by email address or username, for example (resulting in increased efficiency versus, e.g., mailing a check, which requires more steps). However, comparable ease-of-use increases have not been realized for shipping items. There are indeed apps that relate to item shipping, such as Shyp, but these apps simply offload one or more of the above steps to third parties for hire; they do not actually reduce the number of steps (i.e., they do not result in a more efficient process).

Technology has also resulted in increases in privacy for a range of transactions. For example, email and in particular, encrypted email, has increased privacy in messaging. Virtual currencies such as Bitcoin have increased privacy in value exchange. However, item shipping still requires a name and an address to be publicly visible on a package's exterior. Anybody who intercepts a package can know who and where it is intended for.

There is a need for a system and method for shipping an item that reduces the number of steps involved in the physical process and protects shipper and recipient privacy. The present invention is such a system and method.

BRIEF SUMMARY OF THE INVENTION

The present invention is a system and method for shipping an item that reduces the number of steps involved. In one embodiment, it comprises network-connected computer hardware device(s) specially programmed with computer software and packaging comprising a machine readable code, where at least one computer hardware device is capable of reading said machine readable code. The hardware devices may include one or more user devices for shippers and recipients (e.g., customers of a shipping company), scanning devices for package handlers (e.g., employees of said company), and server computers and terminals to interact with the servers for administrators (e.g., employees of said company as well). The server may also be connected to lockers for package dropoff and pickup and third parties, such as courier services. Software running on the above hardware coordinates the shipping process and enables the claimed method in conjunction with the machine readable codes, which are attached to or embedded in the packaging prior to the shipper choosing a recipient for said packaging. This enables label-free shipping, which reduces the number of steps involved in the physical process and protects shipper and recipient privacy. The only marking necessary on the packaging is a machine readable code, which the shipper need not create and which need not contain any useful information to an interceptor. In fact, the shipper need not even know the address of the recipient and vice-versa.

The shipper may obtain the packaging, put the item to be shipped in the packaging, and close and secure the packaging (see steps 1-3 above). However, at least steps 4-5 and 7-8 need not be performed. Rather, the shipper can scan the machine readable code with his or her user device (e.g., a smartphone), enter a piece of information about the recipient less than or other than a name and address (e.g., a phone number), pay electronically, and drop the package off as in step 9. This system and method has the additional benefit of facilitating cost splitting (e.g., as described more fully with respect to the preferred embodiments, if the recipient also has a user device, the shipper can pay to ship the package to a pickup point, and the recipient can pay to have said package further delivered to his or her address).

The invention is described more fully with respect to the preferred embodiment and other embodiments below.

BRIEF SUMMARY OF THE DRAWINGS

The preferred embodiment is described in reference to the figures. To facilitate the reader's understanding of the preferred embodiment, many figures depict illustrative "screenshots" of its software components. These "screenshots" include example data, and refer to "SnapShip," an exemplary business utilizing the preferred embodiment. The accompanying hardware functions and software algorithms required are described in reference to each figure.

FIG. 1 is a depiction of hardware components and connections. As described more fully below, some elements comprise aspects of the present invention, and others comprise hardware the invention is capable of interfacing with.

FIG. 2 is a depiction of software components and connections. As described more fully below, some elements comprise aspects of the present invention, and others comprise software the invention is capable of interfacing with.

FIGS. 6a-6d are depictions of the "My account" screen; scrolling down from 6a one would see 6b and so on, through 6d.
FIG. 7 shows a detail of the functionality of FIG. 6b.

FIG. 15 is a depiction of a screen in the "Ship" process for choosing a package dropoff method/address/location.

FIG. 16 is a depiction of a screen (e.g., in the "Ship" process) for entering an address for a courier to pick up a package from or drop off a package to.

FIG. 26 is a depiction of a screen for a user to pay additional fees (upcharges).

FIG. 27 is a depiction of a screen corresponding to a shipment for a user seeing the screen (the user is a recipient), at a later time than FIG. 24.

DETAILED DESCRIPTION

In the preferred embodiment, the system has three major components: (a) computer hardware, (b) computer software, and (c) specialized packaging. These are each discussed in turn in reference to the figures.

Figure 1:
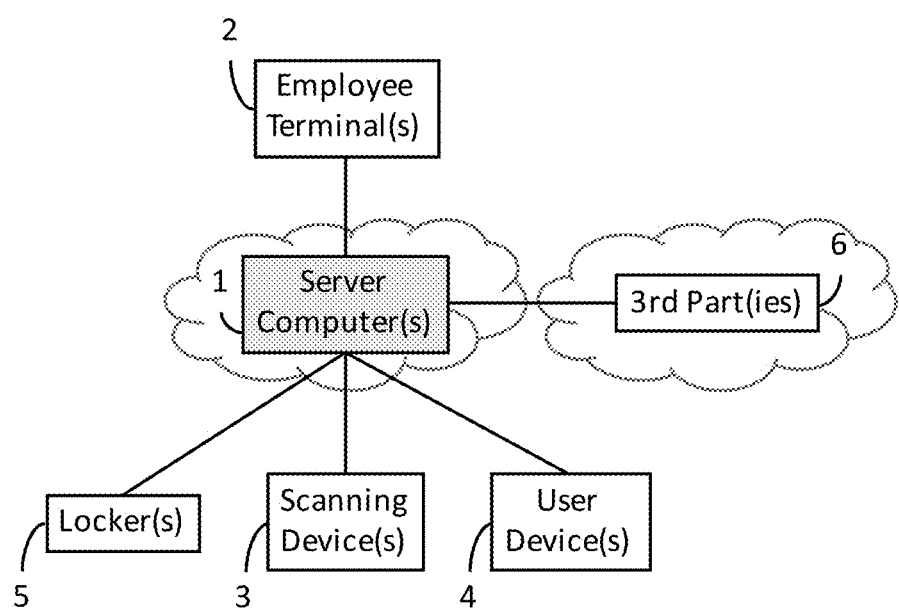

FIG. 1 is a depiction of hardware components and connections. The boxes depict hardware components and the lines depict network connections. The preferred embodiment comprises one or more server computers 1, connected to (a) one or more employee terminals 2, (b) one or more scanning devices 3, and (c) one or more user devices 4. The server computer may also be connected to (d) specially designed package pickup/dropoff lockers 5 and/or (e) other hardware, such as a third party partner's server computer 6 (e.g., the server computer corresponding to a courier service, such as UberRush, or a third party payment processor, such as Paypal). The connections may be internet or intranet connections. Such connections are available from a range of providers such as Verizon.

All of the devices must be capable of sending and receiving data over the network and running software. The employee terminal 2 must further be capable of input/output; in the preferred embodiment, employee terminal 2 is a personal computer with a monitor, a keyboard, and a mouse. The scanning devices 3 and user devices 4 must further be capable of reading a machine readable code of the type used in the system. In the preferred embodiment, as discussed below, the machine readable code is a barcode. In the preferred embodiment the scanning devices 3 and user devices 4 are smartphones with cameras, such as Samsung Galaxy phones or Apple iPhones. Smartphones, tablets, and computers with webcams can be programmed according to techniques known in the art to read barcodes. In the preferred embodiment, scanning devices 3 also have GPS capability.

The package pickup/dropoff lockers 5 may be, for example, the lockers in U.S. Pat. No. 9,082,247 to Turner et al.—which discloses a networked package locker for pickup and dropoff—combined with, e.g., U.S. Pat. No. 6,895,241 to Hara—which discloses opening and closing a lock over a network—to create a locker capable of being locked or unlocked by the server. Note that the lockers in Turner may also be remotely programmed to unlock when a PIN number is entered.

The software running on server computers 1 and third party computers 6 may be spread across a number of computers, e.g., "in the cloud". In addition, despite the use of the term "third party" the various components of the system may all be controlled by a single entity. The third parties may be other divisions of a single company, for example.

Figure 2:
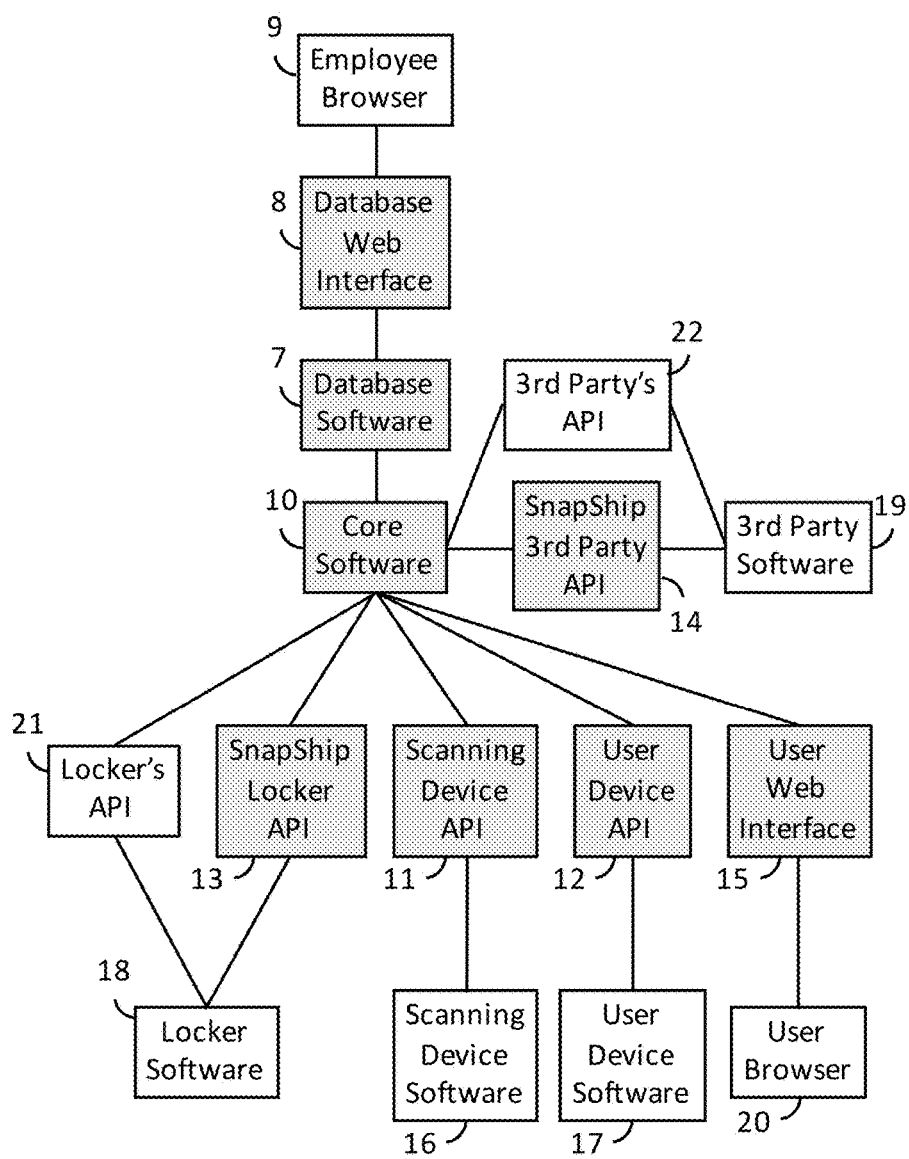

FIG. 2 is a depiction of software components and connections. Database software 7 runs on server computer 1. It stores records and record associations necessary for the functioning of the system. The information to be stored in the database is described in more detail below. The database software may, e.g., be database software by Oracle. Database web interface 8 runs on the server and is a web interface to the data in the database and may be used by, e.g., administrators of a shipping company to view and edit the information in the database. Such interfaces are commonly available from the firms that supply database software (e.g., database software 7) Employee browser 9 is a web browser such as Google's Chrome for viewing and editing the information in the database via database web interface 8; it runs on employee terminal 2.

Core software 10, APIs 11-14, and user web interface 15 run on the server computer 1 as well. Core software 10 comprises the algorithms executed on the server computer other than those pertaining to database software 7, database web interface 8, APIs 11-14, and user web interface 15. Core software 10 enables the functioning of the system, for example, by pushing data to and pulling data from the other components via their respective interfaces and performing other algorithms necessary as described more fully below.

"API" means "Application Programming Interface". Preferably APIs 11-14 are RESTful JSON APIs, which may be programmed according to known methods in the art. APIs 11-14 enable other software to exchange appropriate data (see below) with core software 10 (e.g., by sending messages and receiving replies).

Scanning device API 11 enables scanning device software 16 to do so.

User device API 12 enables user device software 17 to do so.

SnapShip Locker API 13 enables locker software 18 to do so.

SnapShip third party API 14 enables third party software 19 to do so.

Both scanning device software 16 and user device software 17 are preferably apps, such as Android apps (for, e.g., a Samsung Galaxy phone) or iOS apps (for an Apple iPhone). Scanning device software 16 is intended for package handlers. User device software 17 is intended for shippers and recipients of items/packages. The algorithms performed by these apps are described more fully below.

User web interface 15 provides an interface for shippers and receivers who do not want to use a platform-specific app such as an Android app or an iOS app. User browser 20 is a web browser such as Google Chrome, running on user device 4. The combination of user web interface 15 and user browser 20 enables the same functions as the combination of user device API 12 in and user device software 17; these pairs perform functionally equivalent algorithms for purposes of the preferred embodiment. When only user device software 17 and scanning device API 12 are referred to below, it should be understood unless otherwise noted, equivalent functionality may be performed by the combination of user browser 20 and user web interface 15. Creating a web app from a smartphone app and vice-versa is well known in the art.

Locker software 18 and third party software 19 represent software running on lockers 5 or third party computers 6 (respectively) that core software 10 is capable of data exchange with. Core software 10 may communicate with these via either (a) SnapShip Locker API 13 and SnapShip third party API 14 (respectively), or (b) locker's API 21 and third party's API 22 (respectively). The difference is that the APIs in pair (a) run on server computer 1 whereas those in pair (b) do not. Normally (a) would be programmed by whomever programmed server computer 1 and (b) by whomever programmed locker software 18/third party software 19. In other words, these illustrate that core software 10 is capable of communicating on its protocol or on others' protocols (in other embodiments, this could also be true for scanning device software 16 or user device software 17).

Figure 3:
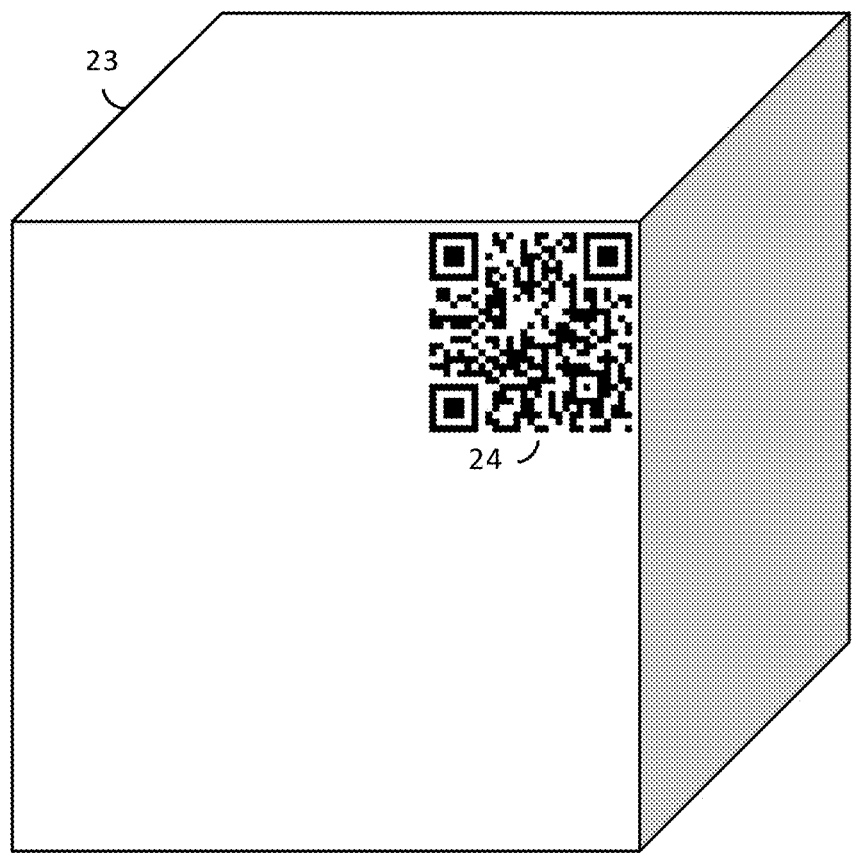
FIG. 3 is a depiction of packaging in accordance with the preferred embodiment. The following figures are all depictions of exemplary screens of the user (e.g., shipper, recipient) software in the preferred embodiment of the present invention.

FIG. 3 depicts packaging 23 and machine readable code 24 to be used with the hardware and software components described above and below. Packaging 21 is preferably self-sealing packaging (such as provided by USPS for flat rate Priority Mail and FedEx for FedEx One Rate). In brief, the machine readable code is an identifier on the package that enables the package to be identified as it is shipped from the shipper to the recipient. Both scanning device software 16 and user device software 17 are capable of reading the machine readable code. In the preferred embodiment, machine readable code 24 is a barcode, as depicted in FIG. 3.

To briefly summarize how said barcode is used, a shipper uses user device software 17 to scan machine readable code 24, enter a piece of information about the recipient, such as his or her phone number, and complete payment. In the preferred embodiment the shipper may also select other options, such as insurance and courier-based pickup (from the shipper, to a dropoff point/location) and dropoff (to the recipient, from a pickup point/location) (Third party software 19 comprises the courier's software.)

Continuing the brief summary, the package is dropped off at a dropoff point/location either by the shipper or a courier, and user device software 17 (if shipper) or scanning device software 16 (if courier) may be used to open a dropoff locker 5. Package handler(s) use scanning device software 16 to open dropoff locker 5, scan machine readable code 24, and receive instructions (e.g., where to take said package). A package handler delivers the package, e.g., to a pickup locker 5, at a pickup point/location, likewise opened by the package handler (to drop the package off) using scanning device software 16. The package is picked up by the recipient or a courier, using user device software 17 (if recipient) or scanning device software 16 (if courier) to open the locker. Data associations are tracked in database software 7 to effectuate the process and communication is coordinated by core software 10 over the lines depicted in FIGS. 1-2, said communication occurring using APIs 11-14 and 21-22. In other embodiments, couriers use third party software 19 to open lockers; in such embodiments, SnapShip third party API 14 may require key based authentication to open a locker (to ensure couriers are authorized).

Given the above, it should be apparent to one in the art that the principal concern regarding machine readable code 24 is that it comprises information sufficient to uniquely identify a package from entry in the system to exit (e.g., from payment to when a package is picked up by the recipient). In the preferred embodiment, said machine readable code is a barcode that encodes data comprising a random alphanumeric string. Said string is generated at the time the packaging is manufactured, e.g., by a third party manufacturer. The manufacturer (using third party software 19) requests a string and a barcode from core software 10. Core software 10 generates a random string and checks it against the strings in use in database software 7 for collisions (duplicates). If there is a collision, it generates additional string(s) until there is no collision. It then returns the string and corresponding barcode image to third party software 19. Core software 10 enters the string into database software 7 and associates it with information regarding the packaging type (e.g., length, width, depth, material, date and time of manufacture, location of manufacture, etc.), which is sent by third party software 19 as a part of the request. Core software 10 may associate information such as pricing and location of distribution as well. The foregoing information may be useful for data mining, e.g., tracking how packaging is distributed and used. The packaging is then ready to be provided to the shipper.

The number of potential strings is preferably large enough that a collision is statistically very unlikely (e.g., the strings are very long), so that a nefarious party guessing a random string is very unlikely to guess an in-use one in a reasonable number of attempts. A similar technique is used in virtual currencies such as Bitcoin, where users randomly generate a private "key" for their wallet (a long string of letters and numbers that must have certain properties) which may be encoded in a barcode. The keys are long enough that collisions (two users choosing the same key) are very rare. In the preferred embodiment, an alphanumeric representation of the barcode (i.e., the string) is printed on the packaging as well, to enable a human to speak the information encoded in the barcode in case of emergency (e.g., no barcode reader available). In other embodiments, if security is a cause for concern, the alphanumeric code may be a second random string, which is then associated with the first string in the database.

To prevent a nefarious party from obtaining a barcode from packaging before said packaging is used by a shipper, the barcode is preferably covered by a "scratch off" coating such as used with lottery tickets. In other embodiments, it may be covered by a holographic seal (these are used for some physical Bitcoins, such as Casascius Bitcoins). In both cases, the shipper can remove the covering immediately before he or she ships and know that no other user has removed it prior.

In other embodiments, machine readable code 24 need not be a barcode; for example, it may be an RFID tag. It need not be unique, either (e.g., UPC codes could be used, allowing packaging to be reused for consumer packaged goods). In such case, the system must be able to uniquely identify each package, however, from entry to exit. This may be accomplished by only allowing one package with each unique code in the system at a time (a second packaging with the same machine readable code 24 as a first packaging would be rejected by core software 10, e.g., at payment time, as long as database software 7 showed the first had not yet been picked up). In other embodiments, the manufacturer may generate the barcode and/or alphanumeric code on its own and provide them to core software 10 (e.g., where collisions are not a concern). In other embodiments, barcodes could be generated, e.g., by a chaotic function as opposed to randomly. And in other embodiments, machine readable code 24 may encode information such as the packaging length, width, and depth, so that it may be accessed without connecting to the server. Such information may be encrypted, e.g., so that only core software 10 may decrypt it.

The remaining figures show exemplary screen shots in user device software 17 and provide a useful basis to walk the reader through the process of shipping a package and the corresponding algorithms and data to be stored in the database. Note that in some cases, parts of the algorithms may be performed by, for example, core software 10, user device software 17, or a combination thereof, in such a way that it does not matter who performs which. Moving parts of algorithms from server to client and vice-versa is well known in the art. For example, data validation may be performed by algorithms running on a smartphone, e.g., user device software 17, or algorithms running on a server (to which said app is connected), e.g., core software 10 or database software 7. Note that user web interface 15, with user browser 20, preferably performs equivalently to user device API 12 with user device software 17, as discussed above.

Figure 4:
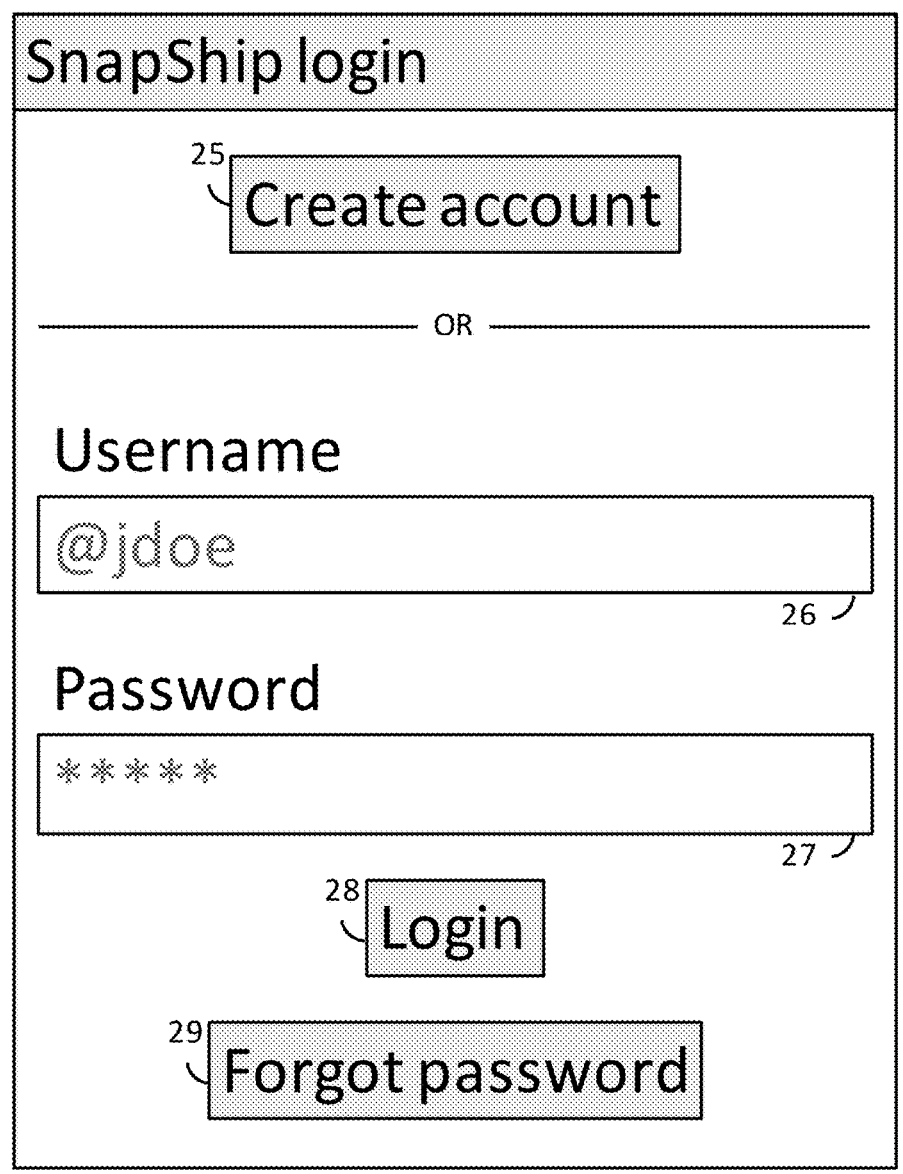
FIG. 4 is a depiction of the login screen.

FIG. 4 depicts the login screen used in user device software 17. This is the first screen to appear when a user opens the app. The login screen has a button to create an account 25, a field to enter a username 26, a field to enter a password 27, a button to login 28, and a forgot password button 29.

Creating an account, entering a username, entering a password, and handling a login and a forgotten password are all well known in the art. However, in brief, clicking the create account button takes the user to the "My account" screen depicted in FIG. 6 (see discussion below), except that "Save changes" button 54 and "Delete" button 55 in FIG. 6d are replaced by a "Create" button. When the user clicks said button, the information entered is sent to core software 10 (via user device API 12, of course), which performs data validation (e.g., checks for username, email, or phone collision or misformatting, returning an error in such a case) and then uses database software 7 to associate the data in a new user record. Preferably, said record also has a unique identifier (e.g., number, incremented with each new account) that doesn't change for the life of the account, so that all other data may be changed and the user still uniquely identified. Login button 28 logs the user in (username and password are sent to core software 10, which checks them against the data in database software 7). Forgot password button 29 sends the username to core software 10, which resets the password in the database to a temporary random password and emails, or if the user hasn't entered an email, texts, the temporary password to the user using the email and/or phone number in the database. Other login methods known in the art are within the scope of the invention, such as biometric (e.g., fingerprint) logins.

In other embodiments, login via a third party website, such as login via Facebook, is available. These can be programmed according to known techniques in the art.

Figure 5:
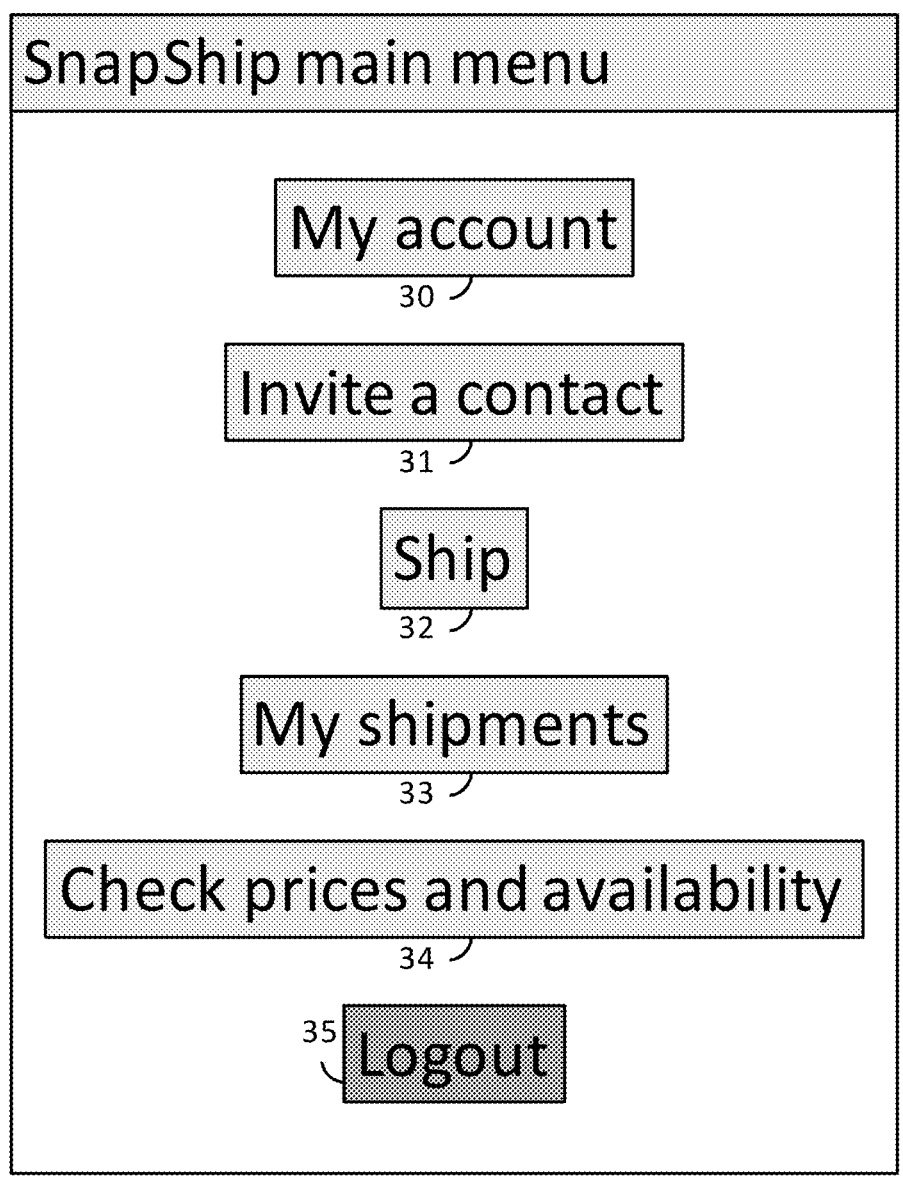
FIG. 5 is a depiction of the main menu.

FIG. 5 depicts the first screen a user sees after he or she logs in: the main menu.

The main menu has five options, as shown: a "My account" button 30, an "Invite a contact" button 31, a "Ship" button 32, a "My shipments" button 33, a "Check prices and availability" button 34, and a "Logout" button 35. Logout button 35 logs the user out and returns to the login screen in FIG. 4. The functions of the other buttons are each described in turn with reference to the other figures.

FIG. 6 depicts the "My account" screen, which is displayed if the user selects the "My account" button 30 from the main menu. FIG. 6a would be displayed first, and 6b, 6c, and 6d in turn as the user scrolls down.

Preferably, when a user is at the "My account" screen or any other screen other than the login screen and main menu, the user can return to the previous screen by swiping left if user device 4 has a touch screen, pressing a back button if user device 4 has such a button, or if nothing else, selecting a bar labeling the current screen at the top of the screen (e.g., bar 36 in FIG. 6a).

The "My account" screen is a data entry form, which are well known in the art. User device software 17 requests settings associated with the current user's account using user device API 12, which causes core software 10 to pull them from database software 7 and return them to user device software 17. User device software uses these to populate form elements 37-45, 47, and 49-54. Some of the data is only shown in a masked form (e.g., password 38, personal account (credit card) number 49, and credit card verification code 51. The user can then change any settings he or she wishes to and select "Save changes" button 55 to validate them and push them to the database, just as when a new account is created (in other embodiments, they may be validated on the fly as they are changed or as each element loses focus, according to known to techniques in the art).

Form elements 37-39, 41, 43-44, and 49-52 are text entry fields. The user can enter text, which is preferably validated (e.g., no username collision, username required, password requirements such as at least 8 characters, password required, no email or phone collision, one of email or phone required, address verification [see below], and credit card verification). User device software 17 preferably displays the type of credit card on the right hand side of the number (this may be determined from the number according to known techniques in the art). Form elements 40 and 42 are checkboxes. Form elements 53-54 are radio button groups. The use of the data in each form element is discussed in detail below at the part of the algorithms where said data would be used.

Form elements 45-48 are buttons that enable the user to set preferred dropoff and pickup locations (dropoff and pickup points, such as Mail Boxes Etc.—type stores). Locations are shown in the order that the user added them, and the user may select the address part of an added location (such as added dropoff location 45 and added pickup location 47) to launch the maps application on the user's device (or if not available, link to a maps website, such as maps.google.com) with a marker on the address of the location; techniques for doing so are well known in the art. The user may also drag locations' names to reorder them. The user may select add new dropoff location button 46 or add new pickup location button 48 to add a new location, as described in more detail below with respect to FIG. 8. A minus sign or icon is displayed preceding each location's name, and selecting that causes the location to be deleted from the list and any locations below to be moved up. In other embodiments, delivery may be only from/to addresses (always couriered). Although dropoff and pickup points/locations may be used internally in such a case, they would not be visible in user device software 17.

In the preferred embodiment, the user pays with a credit card. He or she may enter credit card information into text entry fields 49-52. Text entry field 49 is for inputting the credit card number (user device software 17 displays the credit card type on the right, as discussed above). Text entry field 50 is for the expiration date. Text entry field 51 is for the the credit card verification code. Text entry field 52 is for the billing zip code. In other embodiments, users may link other types of payment accounts according to techniques known in the art, such as bank accounts (for ACH transfers), Paypal accounts, and so on.

Radio button group 53 enables the user to choose settings regarding how the address is chosen when he or she receives a package with courier delivery. The default is "Ask shipper for address." If the user has specified a preferred address for couriers (see form elements 43-44), the user can alternately select "Delivery to my preferred address." Regardless, the user may alternately select "Ask me for address"; the software preferably warns the user that he or she may pay more if the business rules of the party employing the embodiment so dictate (see upcharges below).

Radio button group 54 enables the user to choose settings regarding how the location (pickup point) is chosen when he or she receives a package for self pickup (without courier delivery). The default is "Ask shipper for location." If the user has specified a preferred pickup location (see form element 47), the user can alternately select "Deliver to my preferred locations and if none are available, ask shipper" or "Deliver to my preferred locations and if none are available, ask me." Regardless, the user may alternately select "Ask me for location"; the software preferably warns the user that he or she may pay more if the business rules of the party employing the embodiment so dictate (see upcharges below).

Clicking the "Delete" button 56 will delete the user's account. Preferably, this is disabled if the user has a package in transit to him or her (see discussion of packages in transit below).

Figure 6B:
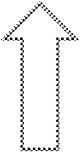
Figure 6B:
Figure 6B:
Figure 6B:

FIG. 7 depicts an alternate view of FIG. 6b. Preferably, when the user enters a partial address in text entry field 44, the system attempts to suggest addresses, or autocomplete, the address as shown in FIG. 7 (for which there are a range of known techniques in the art, for example, a request may be sent to Google). The suggestions, or autocompletes, are displayed in popup menu 57. The user can optionally select one of the options to fill in text entry field 44, which then may be subsequently edited (e.g., to add a unit number).

Figure 8:
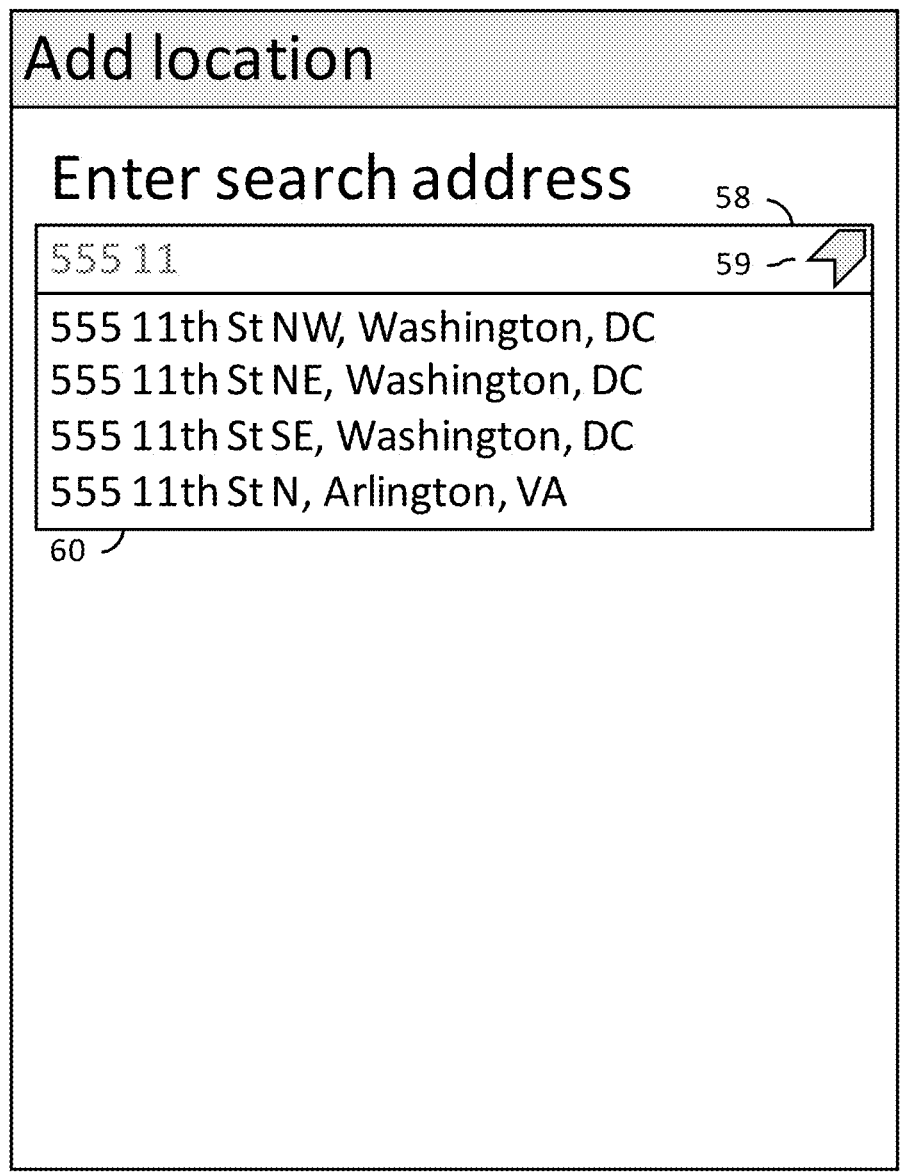
FIGS. 8-9 are depictions of the screen used to choose preferred package pickup and/or dropoff points (locations); proceeding from 8 one would reach 9.

FIG. 8 depicts the add location screen, which is used by other screens to find dropoff/pickup locations. This screen appears, for example, if the user selects add new dropoff location button 46 in FIG. 6b.

The user may enter a search address in text entry field 58, or select "My location" button 59. Preferably, the system attempts to "autocomplete" the address as described above with respect to FIG. 7; the user may then optionally select one of the options in popup menu 60. If the user clicks the "My location" button 59, user device software 17 obtains the user's location (e.g., in GPS coordinates) from user device 4, if available (an error is returned and displayed if not). It preferably sets text entry field 58 to say "My location" in such a case. If the user enters a manual address, address validation occurs according to known techniques in the art. Once the system has a place to search near (e.g., text entry field 58 loses focus and the data entered therein is validated, or the user selects "My location" button 59), it displays the closest dropoff/pickup locations available as shown in FIG. 9.

Figure 9:
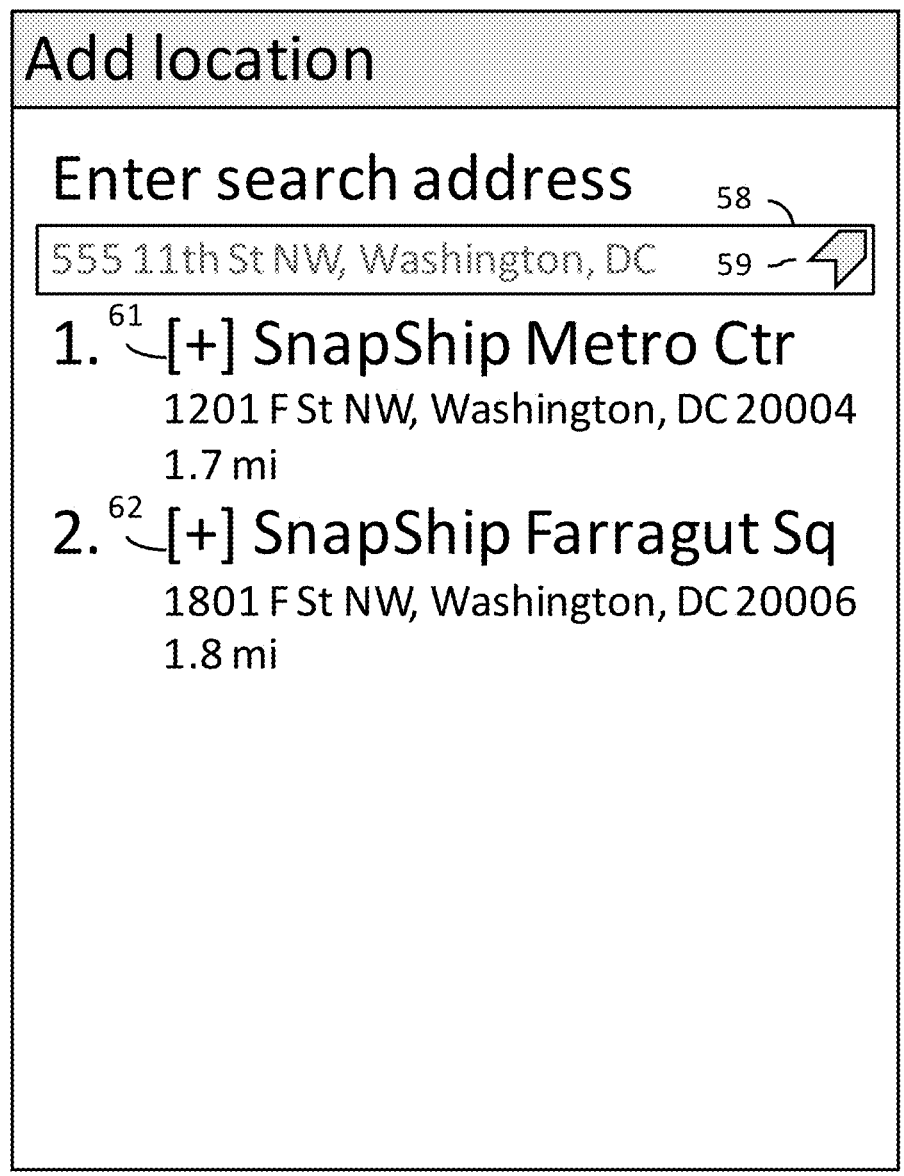

FIG. 9 shows an exemplary screen after the system has a place to search near (e.g., from the screen shown in FIG. 8). Preferably, the place is sent to core software 10, which determines the closest locations by comparing the place to the addresses of available locations, which are associated with each location in the database. (Preferably, the database has an entry for each location, which contains a unique identifier, the location's maximum capacity for pickup and/or dropoff, used capacity for pickup and/or dropoff [both described below], hours of operation, address, and any lockers 5 present.) Core software 10 preferably returns a reasonable number of locations (e.g., up to 10) within a reasonable search radius (e.g., 50 miles). Preferably, the user may scroll down past the end of the list to search for and display additional locations (e.g., the next 10 closest), if any.

The locations found 61-62 are shown in order of closeness to the user, and each is shown with its address and its distance to the search place (returned from core software 10). A plus sign or icon is displayed preceding each location's name, and selecting that causes the "Add location" screen to return the selected location to the previous screen (e.g., the "My account" screen, where it would appear in the space where the plus sign is shown in FIG. 6b, namely add new dropoff location button 46 or add new pickup location button 48). In addition, the user may select a displayed location's address/distance to view the location on a map, as described with respect to FIG. 6 above.

Figure 10:
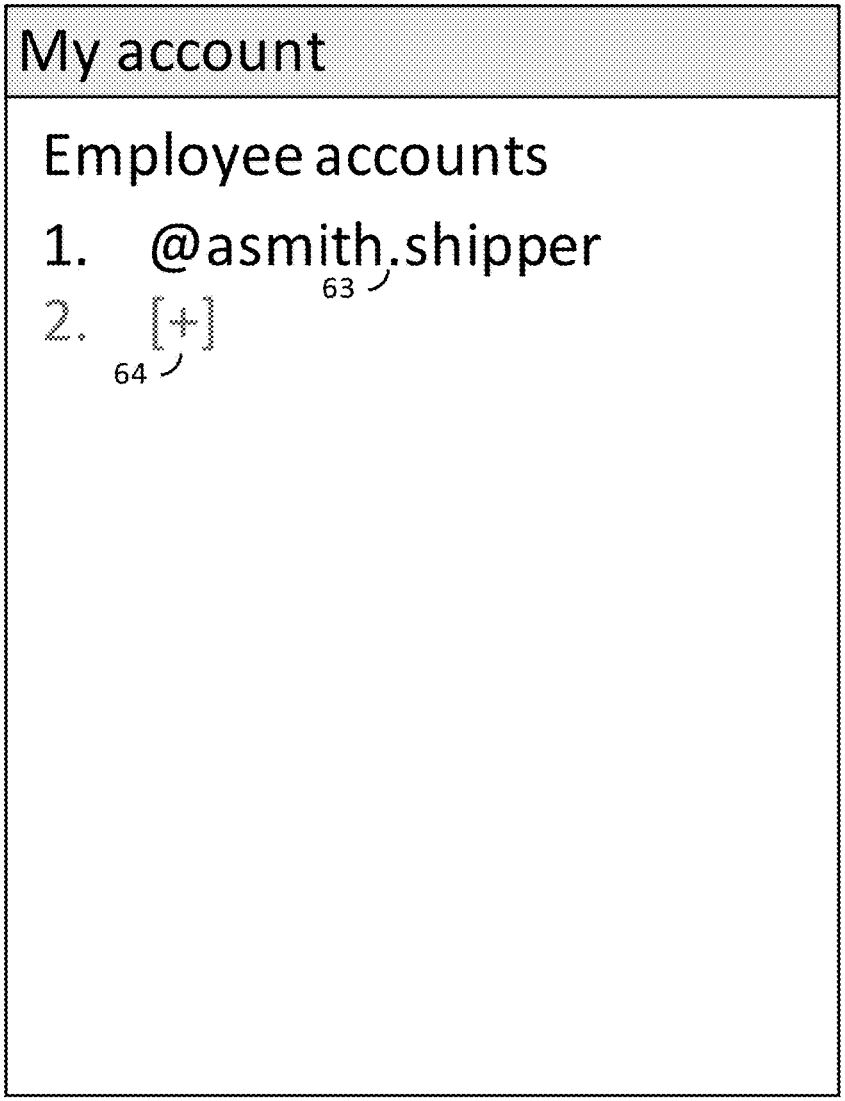
FIG. 10 is a depiction of a part of the "My account" screen shown for users who are managers of other user accounts.

FIG. 10 shows an additional part of the "My account" screen. The system preferably enables an administrator to flag any account as a "manager" account in the database. If an account is so flagged, the screen in FIG. 10 appears if said user scrolls down past the screen shown in FIG. 6d.

The screen displays other accounts in the database associated with the manager's account (e.g., as employees). A user may select an employee account (e.g., employee account 63), which will take the user to a variant of said employee's "My account" screen, discussed below with respect to FIG. 11. The user may also select add new employee button 64, which will take the user to the same screen, except that buttons 72-75 in FIG. 11b are replaced by a "Create" button, as when a user selects "Create account" button 25 in FIG. 4.

Figure 11A:
FIGS. 11a-11b are depictions of a variant of the "My account" screen for users who are managers of other user accounts to edit said other user's accounts; scrolling down from 9a one would eventually see 9b at the bottom.
Figure 11B:
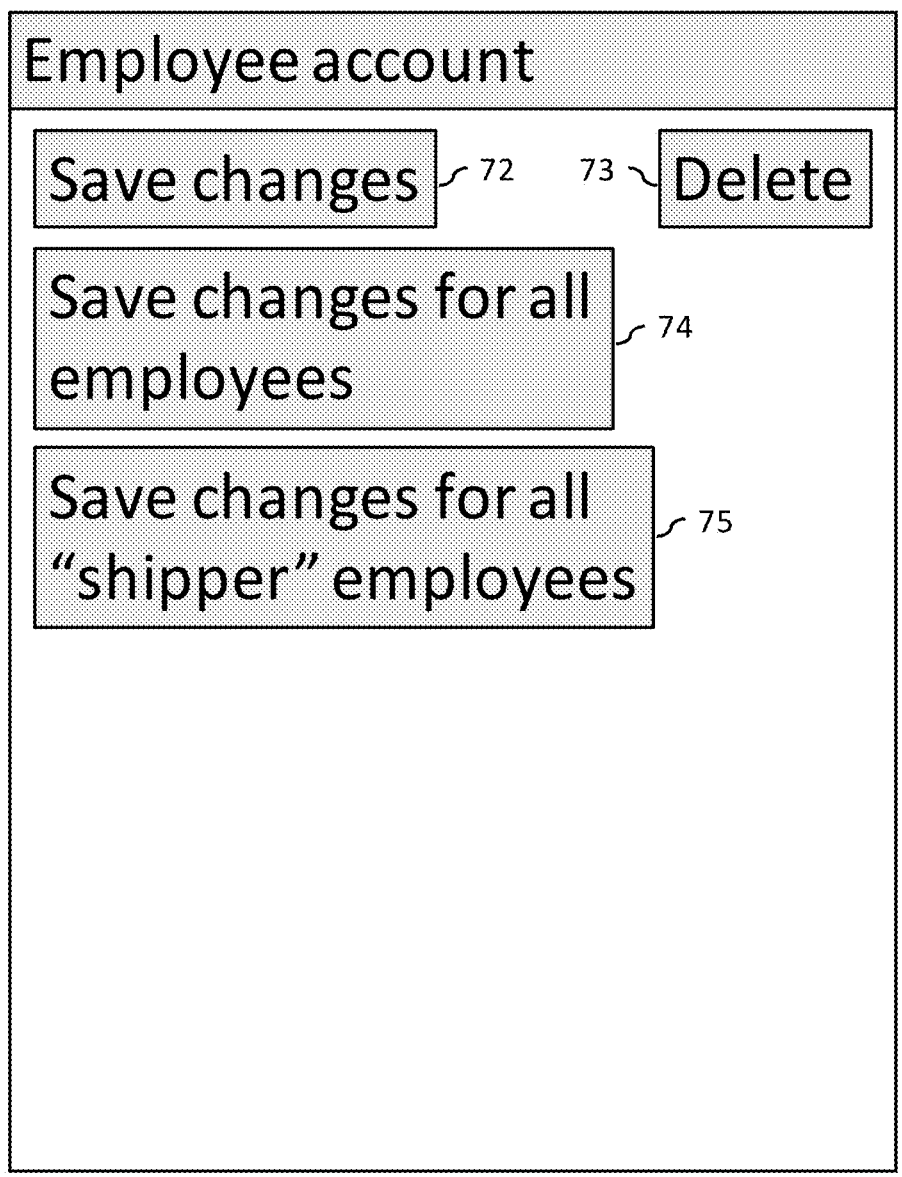

FIG. 11 shows part of the employee account screen. FIG. 11a replaces FIG. 6a and FIG. 11b replaces FIG. 6d (intermediate screens are not shown but follow the pattern of FIG. 11's changes to FIG. 6a, discussed below). Generally, the employee account screen is the same as the "My account" screen, except as noted below. For example, form elements 65-70 in FIG. 11a replace form elements 37-42 in FIG. 6a, and function equivalently. And "Save changes" button 72 in FIG. 11b functions equivalently to "Save changes" button 55 in FIG. 6d, except that it writes the changes to the the employee's account and not the manager's, of course.

The first difference is that, preferably, an employee may be made a member of a "group" of employees by placing a group name after his or her username, the two separated by a period. For example, an employee with username "@asmith" may be made a member of a group "shipper" by changing his or her username to "@asmith.shipper" as shown in FIG. 11*a*. (Preferably, periods are not otherwise allowed in usernames; only managers can insert them and others receive an error upon so attempting, e.g., in text entry field 37 in FIG. 6*a*.)

Second, each form element preferably has an associated by a pair of buttons, namely a "Hide" button and a "Lock" button such as pair 71 in FIG. 11*a*. These function as checkboxes. If "Hide" is selected, the form element will be hidden from the employee when he or she goes to his or her "My account" screen. If "Lock" is selected, the form element is locked (e.g., disabled) so that the employee cannot change it. Preferably, if one is selected (checked) the other is automatically deselected (both should not be selected at the same time because an employee cannot change what he or she cannot see).

Third, more buttons may be added at the bottom of the form, as shown in FIG. 11*b*: "Save changes for all employees" button 74 appears if more than one employee account is associated with the manager account corresponding to the present employee account. Selecting it writes the changes made to all such employee accounts. A second button appears if more than one employee account is associated with the manager account corresponding to the present employee account and any such accounts are members of the same group as the present employee account. For example, "Save changes for all 'shipper' employees" button 75 would appear for account "@asmith.shipper" if, for example, @asmith.shipper's manager has a second associated employee, "@bsmith.shipper". This button is like the preceding one, except that it only applies the changes to other employee account(s) that are a member of said group. Note that delete button 73 will delete the employee account from the database and disassociate it from the corresponding manager account.

Figure 12:
FIG. 12 is a depiction of the "Invite a contact" screen.

FIG. 12 displays the "Invite a contact" screen, which the user arrives at when he or she selects the "Invite a contact" button 31 from the main menu shown in FIG. 5. A user may enter a name, email, or phone number into text entry field 76.

Preferably, the system attempts to display suggestions in popup menu 77, in a manner similar to the address suggestions discussed above with respect to FIG. 7. More specifically, in the preferred embodiment user device software 17 attempts to access any contact lists available on user device 4, and creates a list of <name, email> pairs and a list of <name, phone number> pairs. (If a contact only has a name the contact is not included). It then sends each list to server computer 1, which accesses the user records in the database corresponding to database software 7 and returns the username (if any) associated with each email or phone number in each list to create a list of <name, email, username> triplets and a list of <name, phone number, username> triplets (the usernames may be blank if they were not found). In addition, server computer 1 also accesses lists of emails and phone numbers already invited by the current user (these are associated with the user's record in the database when invitations are sent; see below). The triplets are searched when the user enters something into text entry field 76. Generally, if a name, email, or phone number is a partial match, the triplet is displayed. If the email or phone number has a username, it is displayed but disabled (cannot be selected). If the email or phone number appears in the list of emails or phone numbers already invited, it is displayed and disabled, and "[Invited]" appears in place of the username. Otherwise, it is displayed and a plus sign or icon appears in place of the username. In such a case it is enabled. The popup is preferably sorted by name, then by email/phone as appropriate. Emails appear before phone numbers.

There is one exception to the above: if an entry in the contacts list (from user device 4) has both an email and a phone number or multiple emails/multiple phone numbers. In such a case, if any such email or phone number has a username, the first such that would be displayed is, and every other is suppressed unless it has a different username.

By way of example, in FIG. 10, user has entered "608" in text entry field 76. In the contact list on the user's device there are three entries that match 608 (all match by phone number). The first matching entry 78 has an account @bsmith, the second matching entry 79 has been invited by the current user, but has not created an account (no username). The third matching entry 80 does not have a username and has not been invited, and so a plus sign is displayed.

If the user enters a complete email or phone number, that is sent to the server as well as if it matched a contact (this is the only way to invite a contact if the user's device does not have any available contact lists). Note that there are a range of techniques known in the art for determining whether a string is a valid email, phone number, or neither.

When a user selects a plus sign or icon, user device software 17 sends an invitation request through user device API 12 to core software 10, containing the email or phone number, and, preferably, the username of the present user. This is added to said user's list of invited contacts in the database. In addition, an email is sent to the email or text message to the phone number as appropriate (according to known techniques in the art). The invitation preferably has the sender's username, an invitation message, and a link to access user device software 17. The plus sign then changes to [Invited]. Selecting a username without a plus sign has no effect.

In embodiments in which the user has logged in via a third party, such as a login via Facebook, the system requests the user's contacts from the third party as well (e.g., Facebook friends).

Figure 13:
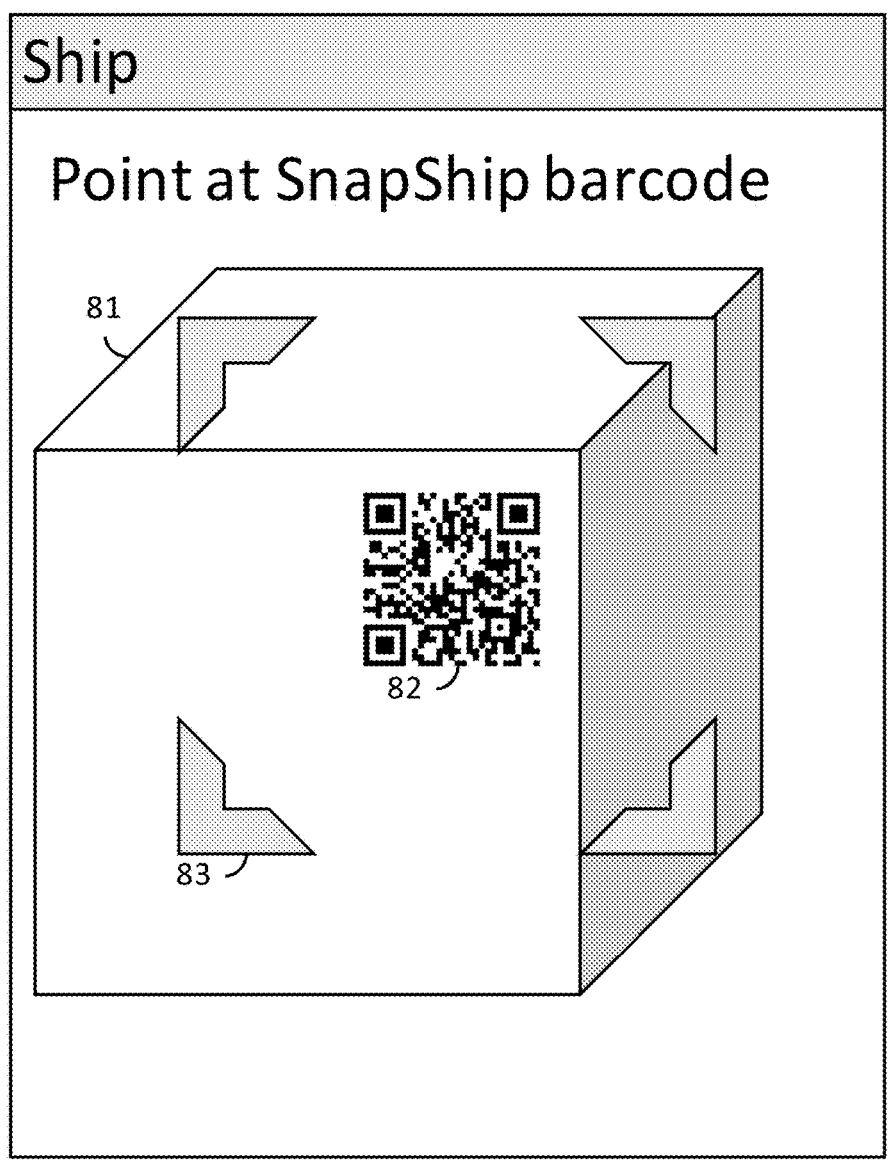
FIG. 13 is a depiction of a screen in the "Ship" process for scanning machine readable codes.

FIG. 13 shows the first screen in the "Ship" process, which begins when a user selects "Ship" button 32 in the main menu. Packaging 81 and machine readable code 82 are of the type of FIG. 3's packaging 23 and machine readable code 24. In the preferred embodiment, when the user points user device 4's camera at machine readable code 22—a barcode, in the preferred embodiment—with said barcode within frame 83, user device software 17 automatically detects and decodes the data encoded in the barcode (methods for this are well known in the art, as are methods pertaining to other machine readable codes, such as RFID tags). User device software 17 then sends the decoded data, via user device API 12, to core software 10, which pulls the record associated with the decoded data from database software 7. Note that as discussed, in the preferred embodiment, the data encoded in the barcode is a random string, which is associated with information regarding the packaging. Thus, in the preferred embodiment if the string is not found in the database, an error is returned and the user is prompted to try again or point the camera at a different barcode.

Note that in embodiments in which the encoded data is recycled or not in the database prior to shipping, core software 10 may check whether said data is in use and return an error if so. In the latter type of embodiments (encoded data not in the database prior to shipping), core software 10 additionally may check whether the data meets specific criteria (such as having a digital signature or a message authentication code). However, in these embodiments information regarding the packaging type (e.g., length, width, depth, etc.) generally will not be available, unless the packaging information has been encoded in the encoded data itself or, for example, is available from a third party based on the code (e.g., for UPC codes).

In the preferred embodiment, assuming the string is found in the database, core software 10 next checks the string's record to see whether it has been associated with any shipment records. If it has been, core software 10 returns an error that the code has already been used. Otherwise, it returns a message to user device software 17 to continue. (In embodiments in which codes are recycled, if the string has already been used but is available, core software 10 returns a message to continue as well, and later associates a subsequent shipment record therewith, e.g., after the user paying).

Figure 14:
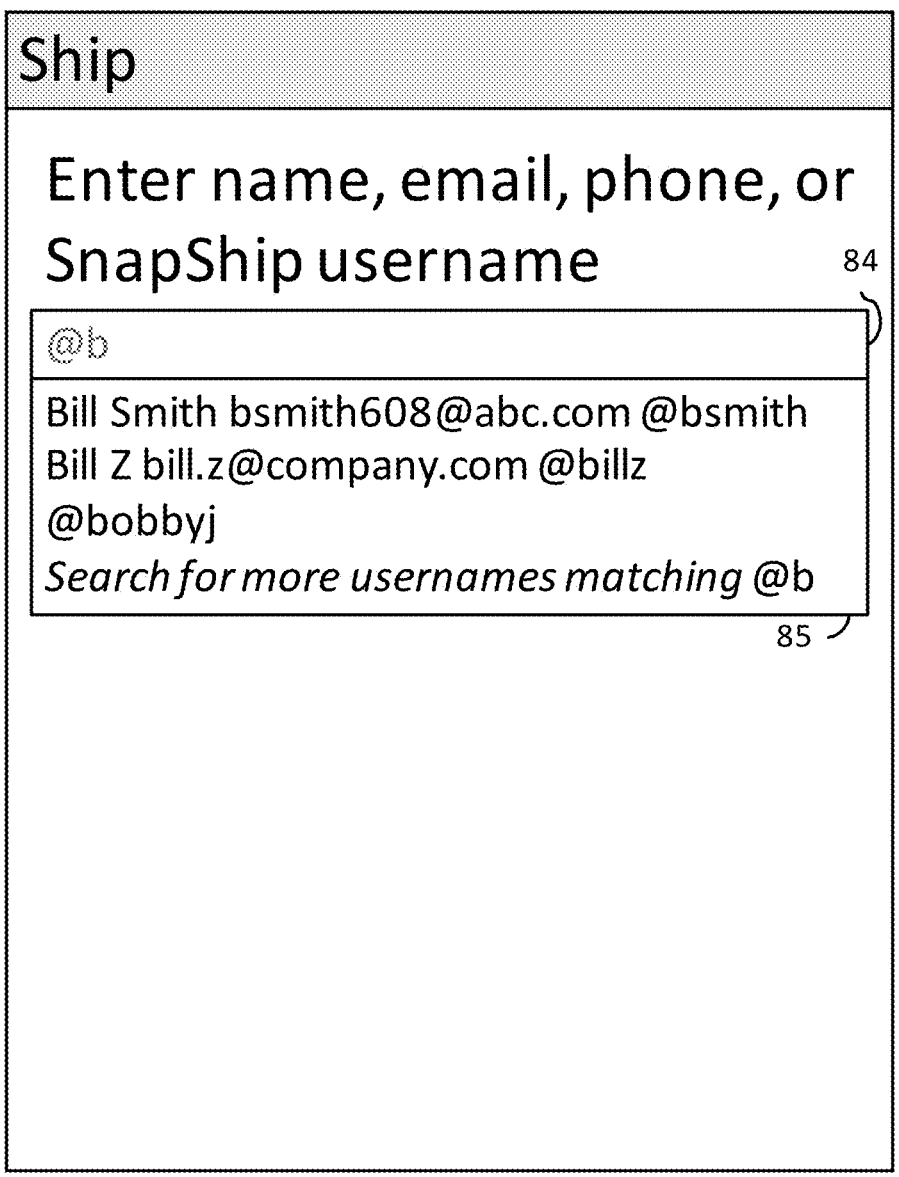
FIG. 14 is a depiction of a screen in the "Ship" process for entering a recipient.

User device software then continues to the next screen, FIG. 14. Note that in some embodiments, it may be desirable to have a mechanism that enables both core software 10 and user device software 17 to uniquely identify a new shipment being created (e.g., prior to the user paying and the shipment being entered into the database as a fully created shipment). There are many known methods in the art for accomplishing this. Such methods are commonly used in ecommerce, for example, to track a checkout in progress. For example, the system could simply use a number, incremented with each shipment being created, returned by the core software 10 when it tells the user software 17 to continue past the first screen in the process. The number then may be passed back and forth with each message. This enables the server to record the data for a shipment as it is being created (e.g., the server records the packaging type, then the username of the recipient, etc.). This is the approach used in the preferred embodiment. In other embodiments, user device software 17 can record the relevant data and send it to the server all at once, e.g., with payment information when the user attempts to complete payment (see below), at which point it would be added to database software 7 as a fully created shipment record and associated with the shipper and recipient's accounts as in the preferred embodiment.

FIG. 14 is the next screen shown. User device software 17 prompts the user to enter the recipient in text entry field 84. This screen preferably functions similarly to the "Invite a contact" screen described above with respect to FIG. 10, with a few differences: First, "[Invited]" and "[+]" are not shown; all users are available to be selected from popup menu 85, not just the users who would have a "[+]" next to their name in popup menu 77 of FIG. 12). Second, core software 10 returns a lists of usernames the current user has previously shipped to and/or received from (from the shipment records associated with said user's record in database software 7). These are used to create new triplets (name, email, and phone number are blank) when a username otherwise does not appear in triplet, and are sorted to the bottom (e.g., "@bobbyj" in FIG. 14). Third, the user can enter a username as an alternative to a name, email, or phone, as illustrated in text entry field 84 of FIG. 14. These are matched against the triplets as well, and if a partial username entered does not match a triplet, a final line is added to popup menu 85 "Search for more usernames matching <partial username entered>", e.g., "Search for more usernames matching @b" as shown in FIG. 14. If the user selects this option, user device software 17 requests that core software 10 search database software 7 for such usernames, and a reasonable number is returned of such usernames the user has not previously shipped to and/or received from (e.g., 10 such names). These are displayed in place of the message, and the message is repeated if any more results are available. To facilitate identifying text intended to be a username, usernames preferably are required to begin with an "at" symbol, e.g., "@bsmith." Once the user selects a recipient from popup menu 85, the recipient is sent to the server and recorded and the software proceeds to the next screen.

If the user selects a recipient who does not have an account and completes the shipping process as described below, core software 10 creates a new account for the recipient in database software 7 with only the email or phone number filled in, as appropriate, and sends an invite to the user as above. The invite preferably includes that he or she has a package en route.

FIG. 15 is the next screen shown, which the user (e.g., shipper) uses to communicate how he or she will get the package to the package handlers (e.g., shipping company employees). In the preferred embodiment, the user can choose to have a courier pick up the package from him or her, or to self drop off the package at a dropoff location/point. The exemplary data shown in FIG. 15 assumes the user has set in his or her settings a preferred address for couriers and a pair of preferred dropoff locations (described above with respect to FIG. 6). Core software 10 preferably pulls said settings from the database and sends them to user device software 17 as part of the reply to user device software 17 sending the selected recipient. For any dropoff locations, core software 10 also projects availability based on the maximum capacity for dropoff and used capacity for dropoff associated with the location's record in the database. This can be projected, e.g., using a newsvendor model (a statistical method known in the art). If any location is projected to be full, the core software returns this as a flag with the location.

User device software 17 displays the preferred courier address 86. The user can select it or select button 87 to choose another address. If the user does not have a preferred courier address set, preferred courier address 86 isn't shown, and button 87 preferably says "Choose address" instead of "Choose other address". Similarly, the software displays preferred dropoff locations, such as unavailable dropoff location 88 and available dropoff location 89. Preferably, unavailable dropoff locations are so marked (e.g., by prepending "[Full]") and cannot be selected. The user can select an available dropoff location or select button 90 to choose another location. If the user does not have any preferred locations with availability, button 90 preferably says "Choose location" instead of "Choose other location". In any case, the user's selection is sent to the server and recorded.

Note that as with other screens that show dropoff/pickup locations/points, here such locations/points are not shown if couriering is required as it may be in some embodiments. In other embodiments, couriering may not be offered and then buttons 86 and 87 and any accompanying text are not shown.

Figure 16:
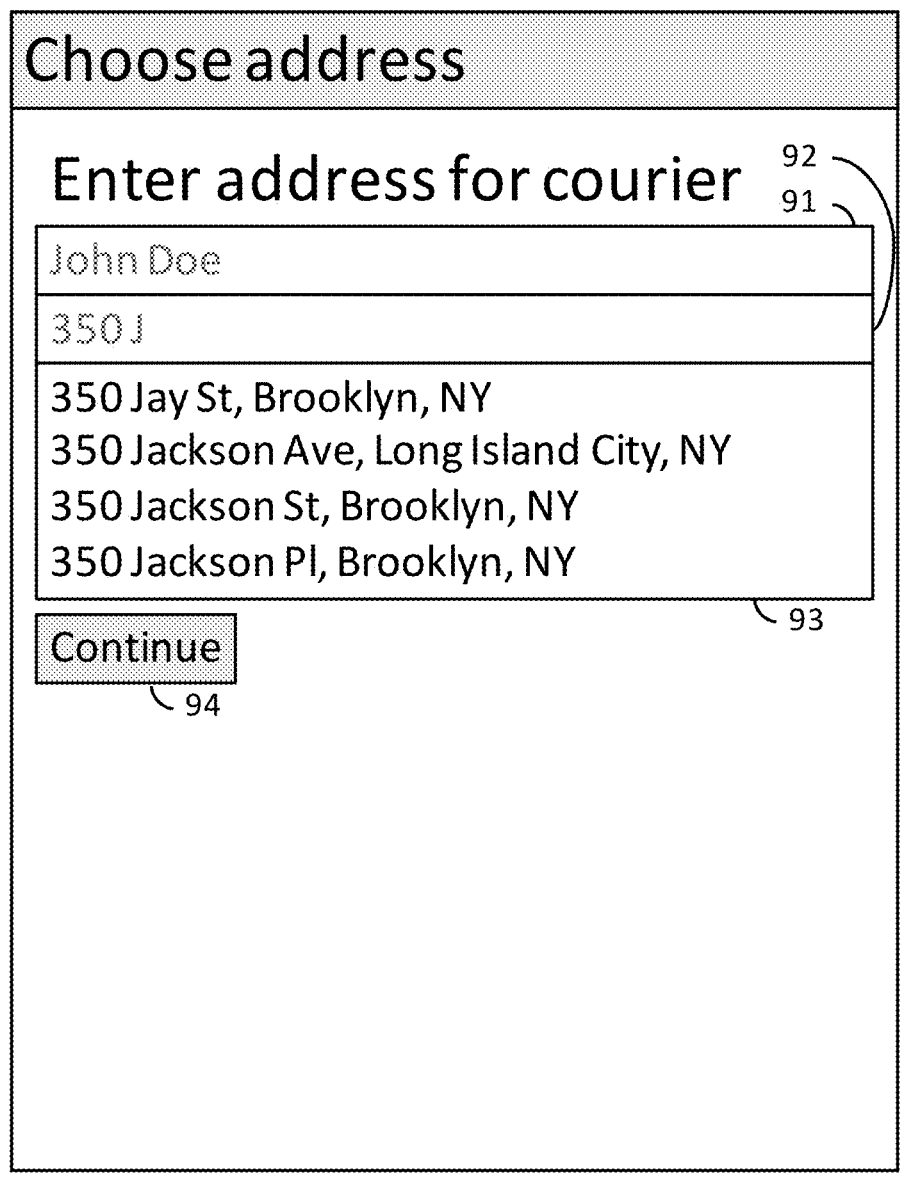

FIG. 16 depicts the screen preferably shown when the user selects button 87 in FIG. 15 to choose a pickup address other than a preferred one. Text entry fields 91-92 function equivalently to text entry fields 43-44 in FIGS. 6b and 7, and popup menu 91 functions equivalently to popup menu 57 in FIG. 7. After the user has finished entering an address, the user selects button 94 to proceed to the next screen, FIG. 18. In any case, the user's selections are sent to the server and recorded.

Figure 17:
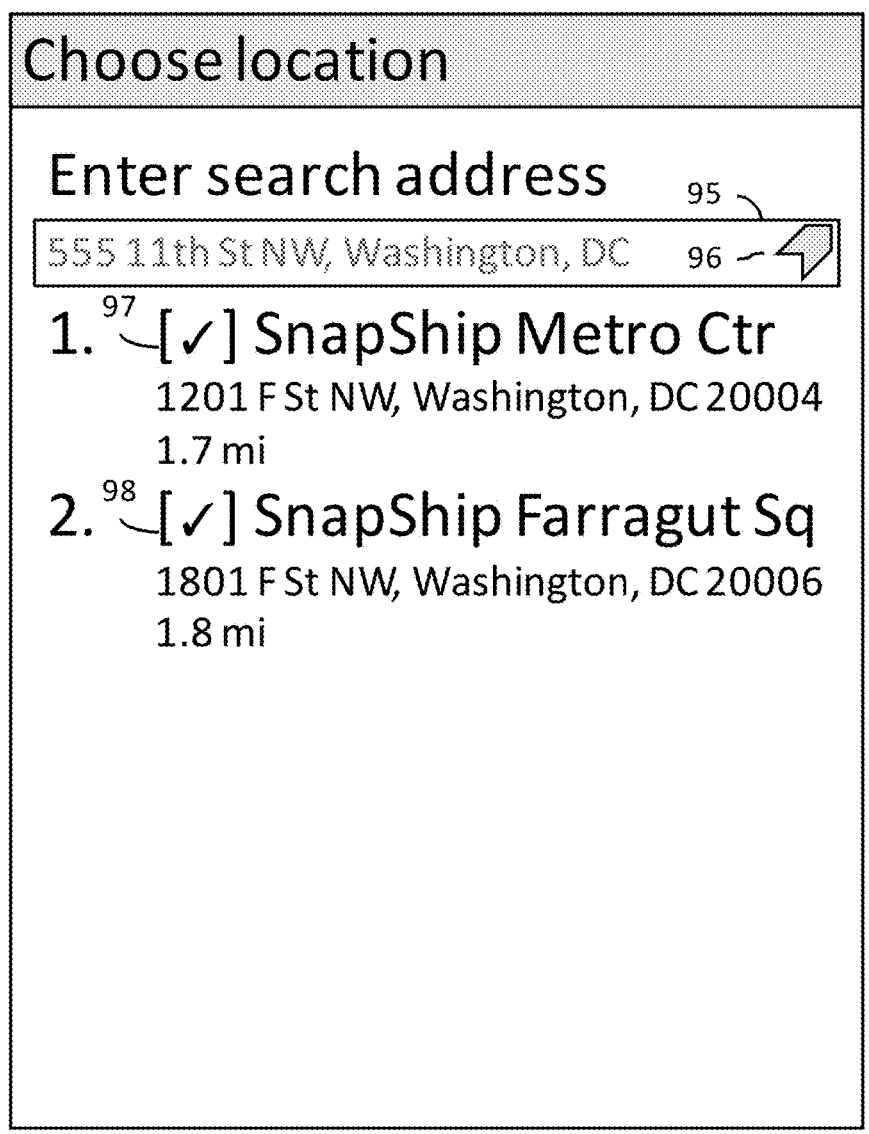
FIG. 17 is a depiction of a screen (e.g., in the "Ship" process) for choosing a package dropoff/pickup location.

FIG. 17 depicts the screen preferably shown when the user selects button 90 in FIG. 15 to choose a dropoff location other than a preferred one. Text entry field 95 functions equivalently to text entry field 58 in FIGS. 8-9, including resulting in a popup menu equivalent to popup menu 60 in FIG. 8 (not shown in FIG. 17). Button 96 likewise functions equivalently to button 59 in FIGS. 8-9. And locations found 97-98 function equivalently to locations found 61-62 in FIG. 9, except that no plus sign or icon is shown. Instead, a checkmark or checkmark icon is shown and selecting it chooses the location and proceeds to the next screen, FIG. 18. However, unavailable dropoff locations are preferably so marked, e.g., with "[Full]" instead of a checkmark, and cannot be selected. In any case, the user's selection is sent to the server and recorded.

Figure 18:
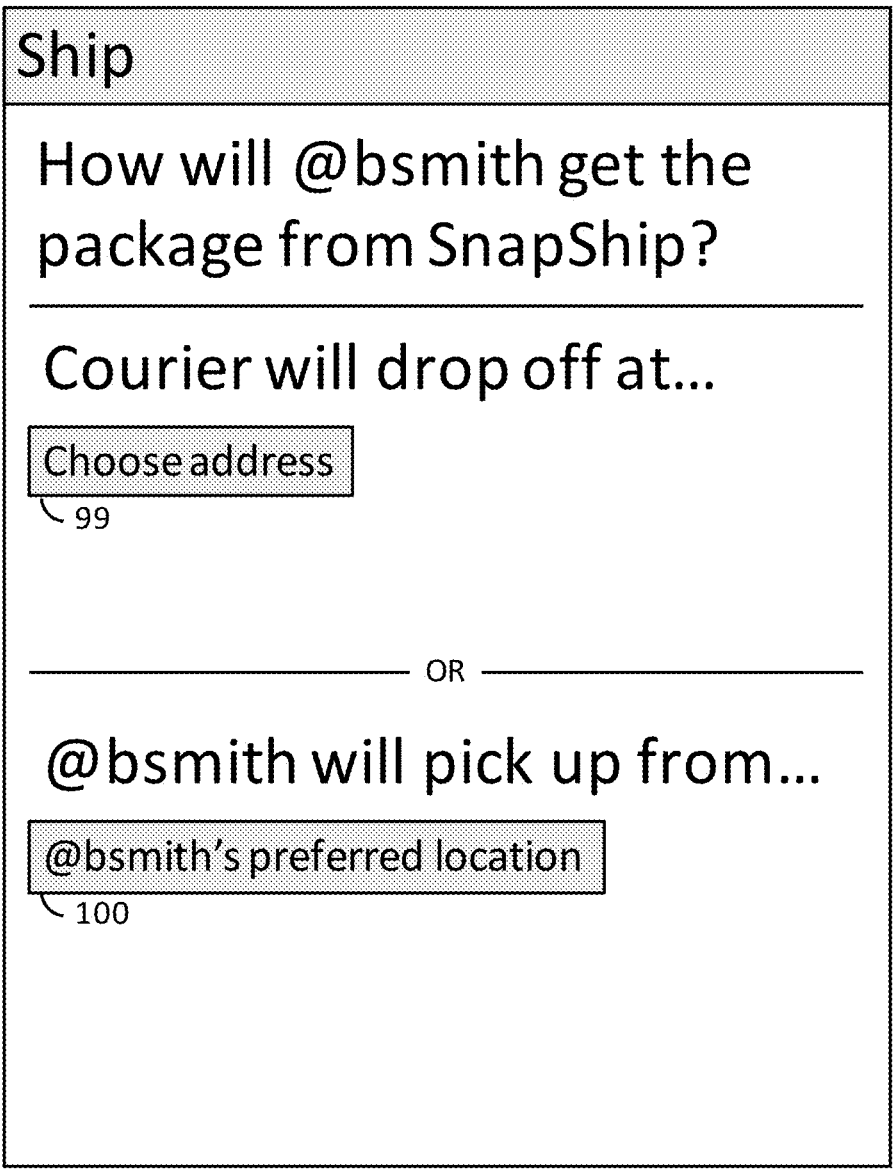
FIG. 18 is a depiction of a screen in the "Ship" process for a shipper to choose a package pickup method.

FIG. 18 depicts a screen for the user to select how the recipient will receive the package. The user arrives at this screen when he or she selects a courier pickup address or dropoff location from any of the screens depicted in FIGS. 15-17. What, exactly, is displayed on this screen depends on the recipient's settings with respect to radio button groups 53 and 54 in FIG. 6c, and potentially, location availability. The information about what to display is preferably returned by core software 10 as part of the reply to the selected recipient.

Figure 19:
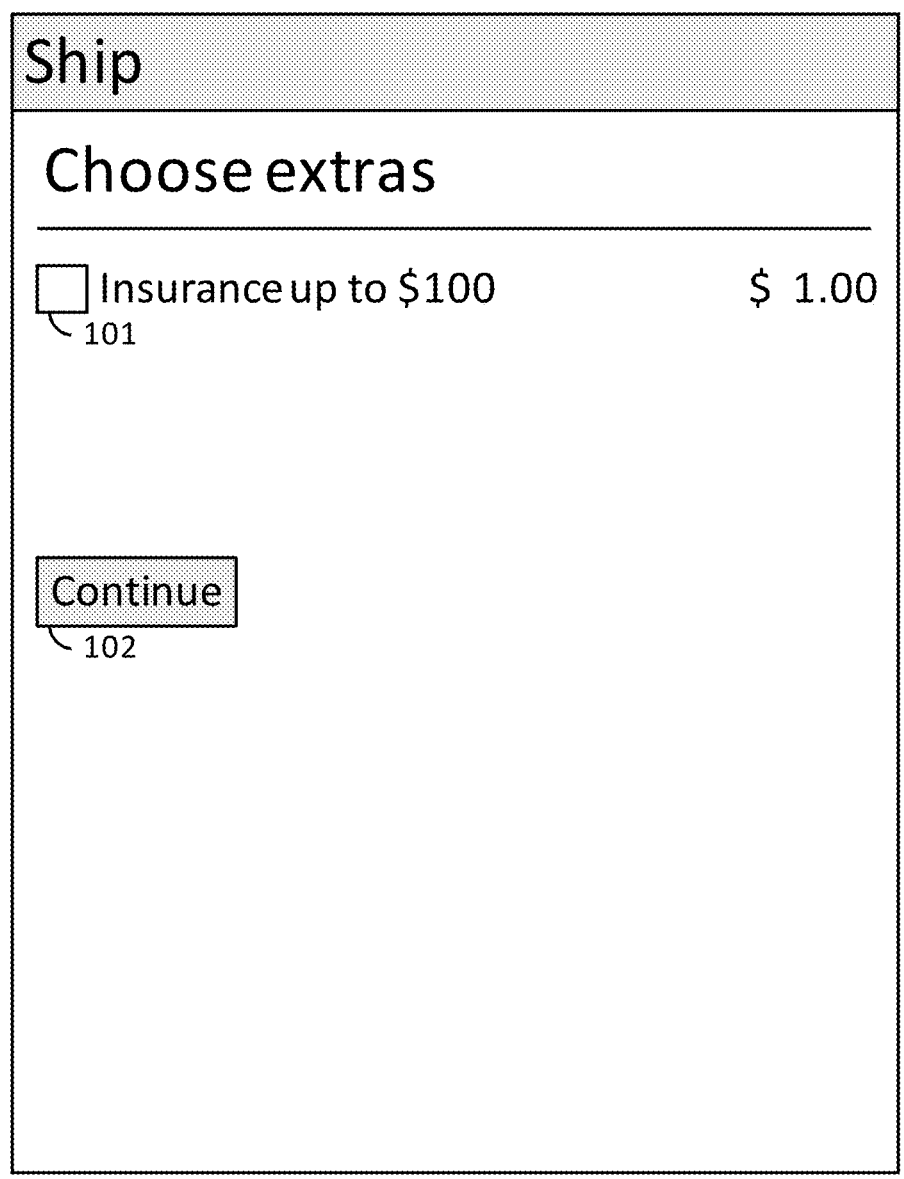
FIG. 19 is a depiction of a screen in the "Ship" process to choose extras, such as insurance.

Referring to radio button group 53 in FIG. 6c, if the recipient's settings indicate "Ask shipper for address", button 99 in FIG. 16 preferably reads "Choose address", and takes the user to a screen equivalent to that discussed with respect to FIG. 16; once the user chooses the address he or she proceeds to the screen shown in FIG. 19. Preferably, "Ask shipper for address" is the default setting for new accounts, and therefore applies to an account created when a shipper ships to an unregistered recipient (such as based on email or phone number) according to the method discussed with respect to FIG. 14. If the recipient's settings indicate any other setting, button 99 in FIG. 18 preferably reads "<@username>'s preferred address", where <@username> is the username of the recipient, and selecting it will take the user directly to the screen shown in FIG. 19.

If the shipper selects the address, said address is sent to the server and recorded. If the recipient's settings indicate "Delivery to my preferred address", the recipient's preferred address is recorded. If the recipient's settings indicate "Ask me for address," the address is recorded as a blank for now. In any case, the system records that the shipment will use a courier to drop off to the recipient if button 99 is selected.

Referring to radio button group 54 in FIG. 6c, if the recipient's settings indicate "Ask shipper for location", button 100 in FIG. 18 preferably reads "Choose location", and takes the user to a screen equivalent to that discussed with respect to FIG. 15; once the user chooses the location he or she proceeds to the screen shown in FIG. 19. The system records the location (preferably by its unique identifier) and also records that the shipment will not use courier for drop off. Preferably, "Ask shipper for location" is the default setting for new accounts, and therefore applies to an account created when a shipper ships to an unregistered recipient (such as based on email or phone number) according to the method discussed with respect to FIG. 14. If the recipient's settings indicate "Deliver to my preferred locations and if none are available, ask shipper," core software 10 goes down the recipient's list of preferred locations in order, checks availability as discussed above, and if none are available, acts as if the user had chosen "Ask shipper for location". Otherwise, or if the recipient's settings indicate any other setting, button 100 in FIG. 16 preferably reads "<@username>'s preferred location", where <@username> is the username of the recipient, and selecting it will take the user directly to the screen shown in FIG. 19.

If the shipper selects the location, said location is sent to the server and recorded. If the shipper does not, if the recipient's settings indicated "Deliver to my preferred locations and if none available, ask shipper" or "Deliver to my preferred locations and if none available, ask me", the recipient's first available preferred location is recorded, if any. In all other cases (e.g., the recipient's settings indicated the latter and there was no available preferred location, or the recipient's settings indicated "Ask me for location"), the location is recorded as a blank for now. In any case, the system records that the shipment will not use a courier to drop off to the recipient if button 100 is selected.

As discussed above with respect to FIG. 15, if couriering is required or not offered, this screen would only display button 99 or 100 and accompanying text, as appropriate.

FIG. 19 shows an exemplary screen for the shipper to add extras. The shipper arrives at this screen as discussed above with regard to FIG. 18. The screen is preferably a form whose elements are set according to the business rules of the entity employing the system (e.g., the shipping company). Different embodiments may offer different extras, which are simply other options related to the shipment. Each extra is displayed next to a checkbox, such as checkbox 101; some embodiments may use radio buttons or other form elements known in the art such as combo boxes as well. In the preferred embodiment, an extras screen is shown which offers to sell the user insurance at a price, as depicted in FIG. 19. The insurance may depend on the packaging type, distance, use of courier pickup or dropoff, etc., according to rules in core software 10 and/or database software 7, but in the system corresponding to FIG. 19, it is sold for a fixed price. The user may make any selections he or she desires using the data entry form of FIG. 19, and may select button 102 to continue; the selections are sent to the server and recorded. In any case, the user is taken to the screen shown in FIG. 20.

Note that in some embodiments, the extras available and any associated pricing may depend on the packaging used or other data available (destination, etc.), according to the business rules of the entity employing the system.

Figure 20:
FIG. 20 is a depiction of a screen in the "Ship" process to see and pay shipping charges.

FIG. 20 shows a price breakdown 103 generated based on the user's selections, as well as payment options. Preferably, the breakdown is calculated by core software 10 and returned to user software 17 in reply to the extras sent to the server, according to the business rules of the entity employing the system in core software 10 and/or database software 7. In other embodiments, a "running" price total may be displayed on previous screens as well, adjusted with each option selected, and the options may show the effect on the price when they are selected (e.g., each location could have a "[+$X.XX]" next to it).

In the exemplary depiction in FIG. 20, price breakdown 103 contains
(1) a flat fee based on the packaging type
(2) a distance surcharge based on the origin and destination (e.g., +$1.00 from a location in one state to a location in another, as opposed to a location in the same state)
(3) a courier pickup surcharge
(4) a courier dropoff surcharge (5) any surcharges for any extras. In the preferred embodiment, the insurance extra is displayed and the price or "declined" is shown as appropriate.

A total is also shown. In the preferred embodiment, the pricing is calculated as follows:

A flat fee is associated with the packaging type in the database, resulting in (1).

If courier service is to be used for pickup and/or dropoff, core software 10 determines dropoff and/or pickup locations (points) respectively that the courier will take the package to/pick the package up from (preferably the closest available location to the address the courier will pick the package up from/take the package to). Core software 10 then takes these location(s) (if courier) or the location(s) selected (if not courier) and determines the distance surcharge (2) based on the pair using database software 7, which has a table of surcharges for each pair.

The courier pickup surcharge (3) and courier dropoff surcharge (4) are determined by sending a request to third party software 19, e.g., with third party's API 22, containing the courier "from" and "to" addresses. Note that the system may determine which third party to contact based on the corresponding locations in question (e.g., different courier services can be used in different cities), and the "third party" can be a business division of a business entity employing the system.

The surcharges for any extras (5) follow from the extras selection on the previous screen.

Other embodiments can include flat fees for courier services or other services or other pricing breakdowns as appropriate.

In the preferred embodiment, if the destination is not known yet because the recipient has opted to be contacted to choose it, the courier's minimum dropoff fee (if courier dropoff was selected) is displayed (this can also be determined by sending a request to third party software 19). The recipient will pay for this as well as the distance surcharge as an upcharge when he or she chooses the destination, unless the reason the recipient will be contacted is because none of his or her preferred locations are available (see discussion of upcharges below). In other embodiments, a price range may be displayed, and a "hold" for the maximum amount may be placed on the shipper's credit card, with the final price being charged once the recipient chooses the destination. In such a case the shipper's notification (see below) may include the final price.

Payment button 104 appears if the user has set saved payment information, e.g., in data entry fields 49-52 shown in FIG. 6c. Preferably it displays a masked version of the user's credit card number and the card type, formatted the same as field 49 in FIG. 6c. In other embodiments, the shipper may pay by other mechanisms such as a bank account (ACH) transfer, a Paypal account, or a virtual currency. For a credit card or bank account, selecting payment button 104 initiates a transaction, e.g., from user device software 17 through user device API 12, core software 10, and third party's API 22, to a third party software 19 (the payment processor's software) with the corresponding saved payment information or a token therefor (Generally, interfacing with a third party payment processor to complete payment is well known in the art, as is using tokens for doing so.) In the case of a virtual currency, selecting payment button 104 may display a payment barcode from a third party payment processor such as Bitpay; this is sent to user's device 4 and displayed on the screen. In any case, the system waits until it receives confirmation from the third party that payment has been completed; then the user is sent to the screen shown in FIG. 22.

Alternate payment button 105 enables a user to use alternate payment information. It takes the user to the screen shown in FIG. 21. Preferably, it says "Choose other card" if saved payment information has been set; otherwise, it says "Choose card".

Figure 21:
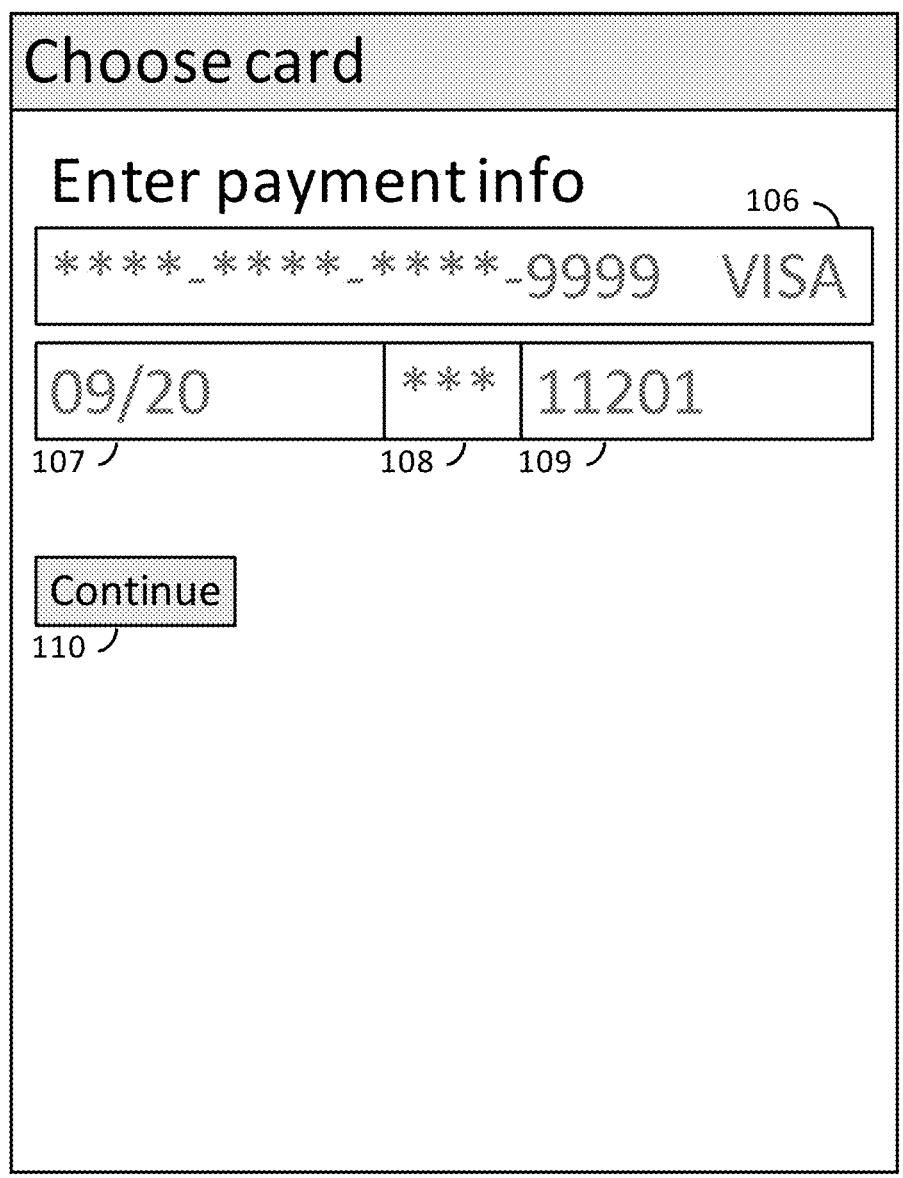
FIG. 21 is a depiction of a screen for choosing a credit card.

FIG. 21 depicts a screen that enables the user to enter payment information. Preferably, data entry fields 106-109 function equivalently to data entry fields 49-52 discussed above with respect to FIG. 6c. Once the user has entered the payment information, he or she selects continue button 110. The payment information is processed as described above with respect to FIG. 20 and then the user is sent to the screen shown in FIG. 22.

Regardless of whether payment is completed on the screen shown in FIG. 20 or FIG. 21, preferably once payment has been made core software 10 checks to ensure that available capacity remains in the appropriate dropoff and pickup locations as discussed above. If it does, core software 10 increases the used capacity in each. If it does not, preferably core software 10 sends a message to user device software 17, which informs the user, and initiates a message to the payment processor to refund the transaction. In some embodiments, the system may return the user to the screens depicted in FIGS. 15-18 as necessary to choose alternate dropoff and/or pickup methods/locations. In some embodiments, the system may offer a credit on the user's account as a means of redress.

Core software 10 preferably assigns a unique identifier to the current shipment (e.g., an integer, incremented with each shipment). It then associates this number with the shipment and the now fully created shipment record with the shipper and recipient's accounts. Such fully created shipment record includes, e.g., the number, the packaging's string/identifier, the shipper and recipient's unique identifiers, the origin and destination locations (and addresses, if applicable), any selected extras, and the price breakdown and payment method (subsequent price breakdowns and payment methods are added if upcharges are paid for as discussed below).

Figure 22:
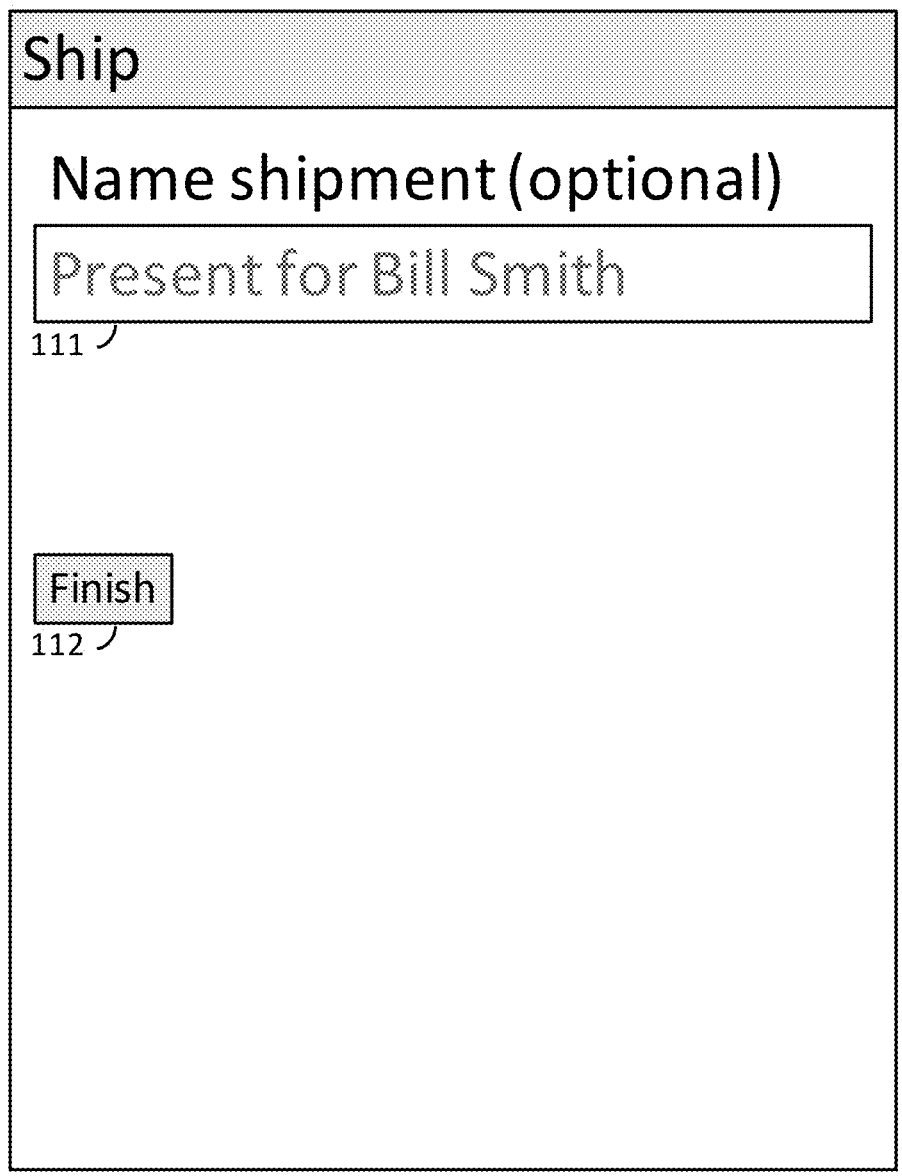
FIG. 22 is a depiction of a screen in the "Ship" process to name a shipment.

FIG. 22 depicts a screen that enables a user to name the shipment. The user can enter any name in text entry field 111. When the user selects continue button 112, the name, if entered, is sent to the server and associated with the shipment record in the database. In either case, the user is informed that the process is complete and the user is returned to the main menu.

Figure 23:
FIG. 23 is a depiction of the "My shipments" screen.

FIG. 23 depicts the "My shipments" screen, which the user arrives at if he or she selects the "My shipments" button 33 from the main menu shown in FIG. 5. User device software 17 requests the shipments associated with the user's account (either as a shipper or a recipient) from core software 10, which pulls them from database software 7 and returns them. User device software 17 then displays them as buttons. For example, in FIG. 23 buttons 113-114 represent shipments to the user, and buttons 115-116 represent shipments from the user. The shipment name (e.g., from text entry field 111 in FIG. 22) is displayed as well as the other party's username (if available, or email address or phone number if the user has not registered yet).

In the preferred embodiment, database software 7 enables a tracking history to be associated with each shipment. The tracking history is facilitated by scanning device 3 in FIG. 1, scanning device API 11 in FIG. 2, and scanning device software 16 in FIG. 2. Essentially, a package handler (e.g., employee of a shipping company or a courier) has a scanning device 3 (preferably a smartphone) running scanning device software 16 (preferably an app). In the preferred embodiment the app is much less complex than user device software 17. It has a login screen similar to that of FIG. 4, except that the option to create an account is not present (the accounts may be created, e.g., using employee terminal 2 of FIG. 1 running employee browser 9 of FIG. 2). Once the scanner logs in, he or she sees a screen similar to that of FIG. 13. The scanner points the camera at a machine readable code and receives instructions as a result. For example, when a courier points the camera at a code on a package, the code is sent to the server and the server records the scan and returns a message telling him or her the address to take the package to (the address may also be sent to third party software 19, e.g., the courier's employer, to send to the courier's GPS software).

When a package handler arrives at a dropoff locker such as 5 to pick up new shipments, if there is a dropoff locker 5 he or she preferably scans a barcode on the side of the locker encoding a unique identifier for the locker and, assuming the locker's unique identifier appears in a list of authorized lockers in the database associated with this package handler, core software 10 communicates, e.g., via locker's API 20, to locker software 18, to open locker 5. If lockers are not used, preferably a barcode is still scanned to pickup packages (e.g., displaying a message the package handler is authorized to pick up from the location corresponding to a unique identifier encoded in the scanned barcode).

The package handler (or another package handler) then scans each barcode of each package in the locker and is told where to deliver it (e.g., the pickup location or another warehouse or sorting facility en route to the pickup location). Where they should be taken is determined by setting routes in the database. In the preferred embodiment, the next point in each route may be defined by an address corresponding to a range of current GPS coordinates (obtained from scanning device 3 by scanning device software 16 and sent to core software 10) and a destination location/point. In other words, corresponding to each <GPS coordinates, destination> pair is an address. The exact routes will depend on the business rules of whomever is using the system (in a basic system, it simply tells the package handler to take the package to the pickup location). The address is preferably formatted into a message and then displayed by scanning device software 16 so the package handler knows what to do. Routes may also be defined using a dummy destination for packages that do not yet have a destination. Such routes may indicate that the package should be held wherever it is, e.g., via a special dummy address. The final point in a route (e.g., pickup location/point) may be defined by a special dummy address as well.

When a package handler is at the final point in a route, he or she scans the package and core software 10 recognizes it is at its destination. At this point, core software 10 assigns it a package number (e.g., locker number) and a random package PIN (e.g., locker PIN) to the shipment in the database, and preferably communicates as above to open the appropriate pickup locker 5 at the location, if any. It displays the package number, and, in embodiments where necessary to secure the package, the package PIN (e.g., if said package is to be stored in a safe of the type commonly found in hotel rooms).

At each scan of a package, a status code, date/timestamp, GPS coordinates (from the scanner's device), and a unique identifier associated with each scanner's account (assigned, e.g., when such accounts are created) are recorded in a "scan" record, and a chronological list of scan records is associated with each shipment in the database.

Scan records are also recorded when users create a new shipment, change (or set) a pickup method after a shipment has been created, drop off at a dropoff locker, or pick up from a pickup locker (the last two of these are discussed in more detail below).

The status codes are preferably:
1. Waiting for recipient to choose pickup method/location/address
2. Waiting for a courier to pick up package from shipper
3. Courier in transit from origin address to dropoff location
4. Waiting for shipper to drop off package at dropoff location
5. Package arrived at dropoff location
6. Package in transit from dropoff location to pickup location
7. Package delivered to pickup location and waiting for a courier
8. Courier in transit from pickup location to destination address
9. Package delivered to pickup location and waiting for recipient
10. Package picked up by recipient (from pickup location or courier)

Said codes are set for each scan as appropriate, e.g., based on lookup tables in the database corresponding to the current code, the scanner, and the package's position in its route.

Returning to FIG. 23, preferably buttons 113-116 display the most recent status code (formatted as a message to the user, e.g., "Waiting for you to choose pickup method" for a recipient user with status code 1 above). Preferably the date/time of the scan is shown for status codes 7-10 above. In addition, the buttons are preferably color coded by status, with code 1 being red for a recipient, 2 & 4 being red for a shipper, and 8-9 being green for a recipient.

In some embodiments, the business using the system may guarantee delivery by a certain date/time; if so, this is preferably shown as well for status codes 3 and 5-8 (calculated by core software 10 based on the timestamp for status code 3 (for packages couriered to the dropoff location) or 5 (for packages self-delivered to the dropoff location by the shipper, according to the business rules). In addition, it is recalculated if the package is rerouted (see below) based on the time/place of the reroute.

Figure 24:
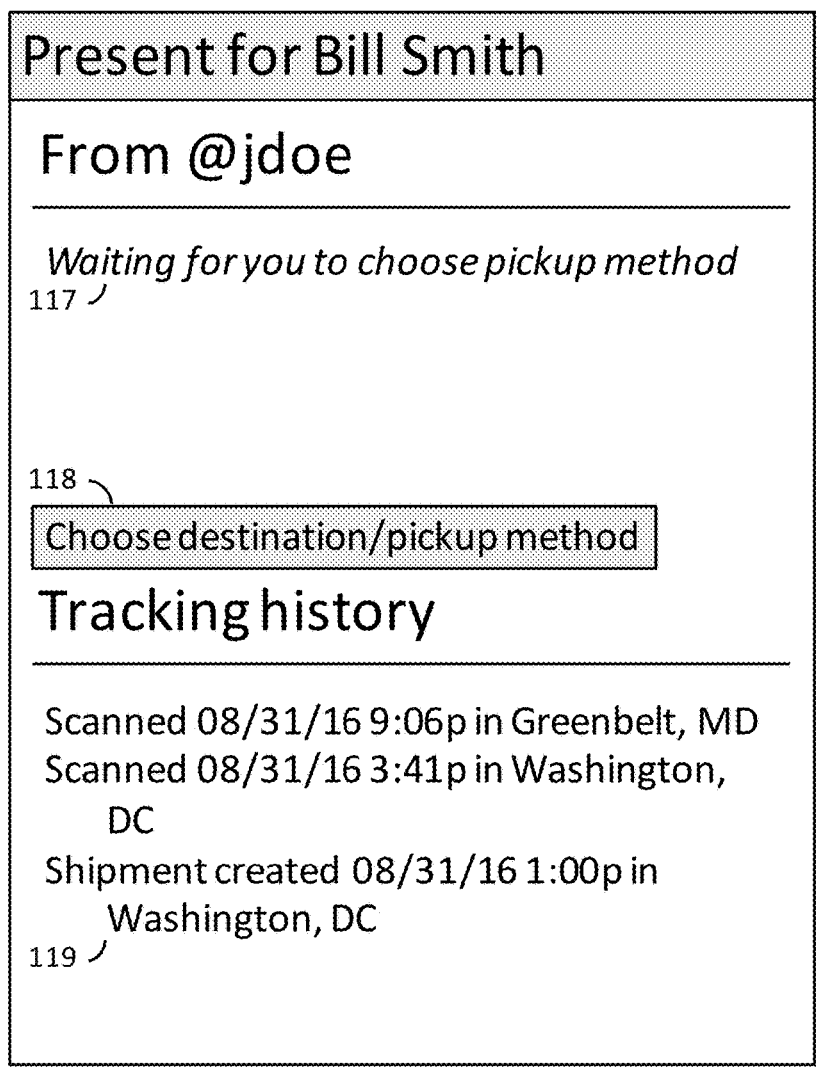
FIG. 24 is a depiction of a screen corresponding to a shipment for a recipient seeing the screen, at a certain time.
Figure 28:
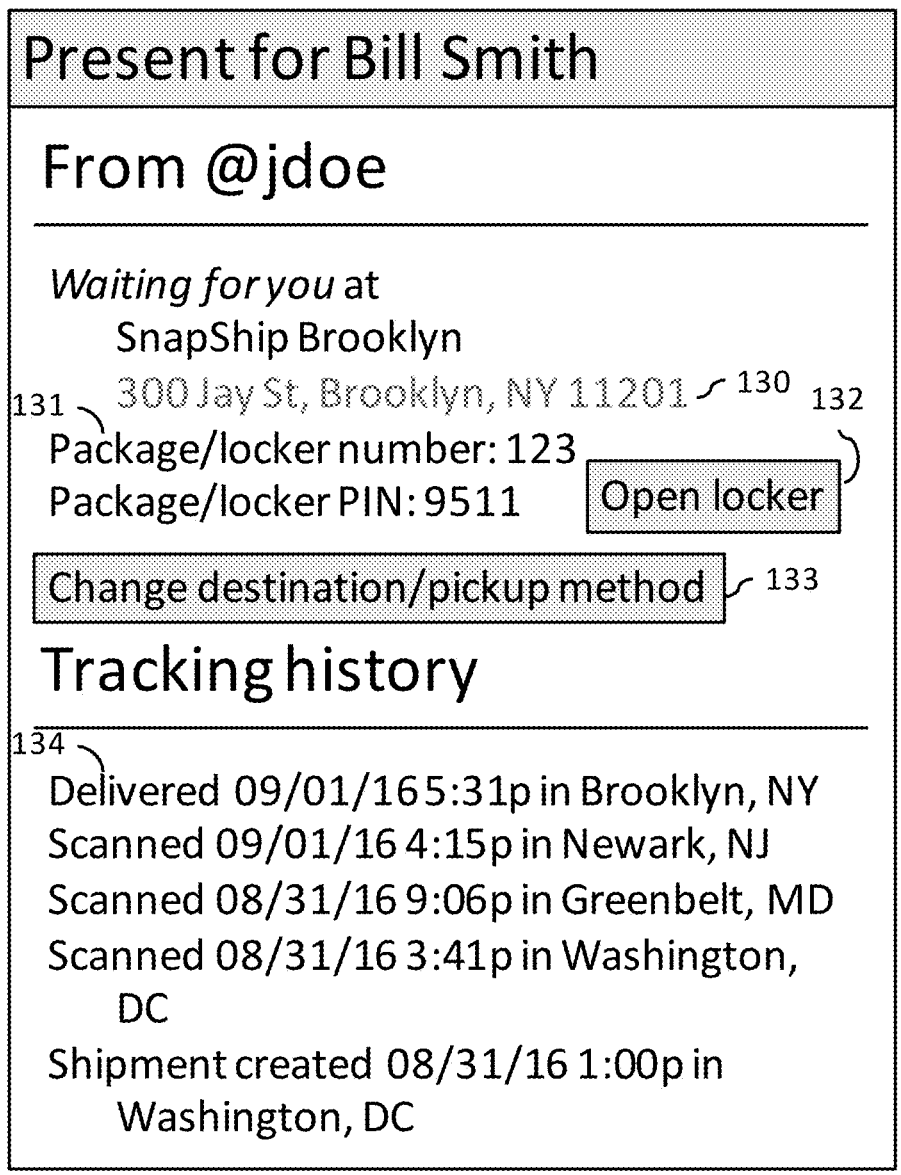
FIG. 28 is a depiction of a screen corresponding to a shipment for a user seeing the screen (the user is a recipient), at a later time than FIG. 27.
Figure 29A:
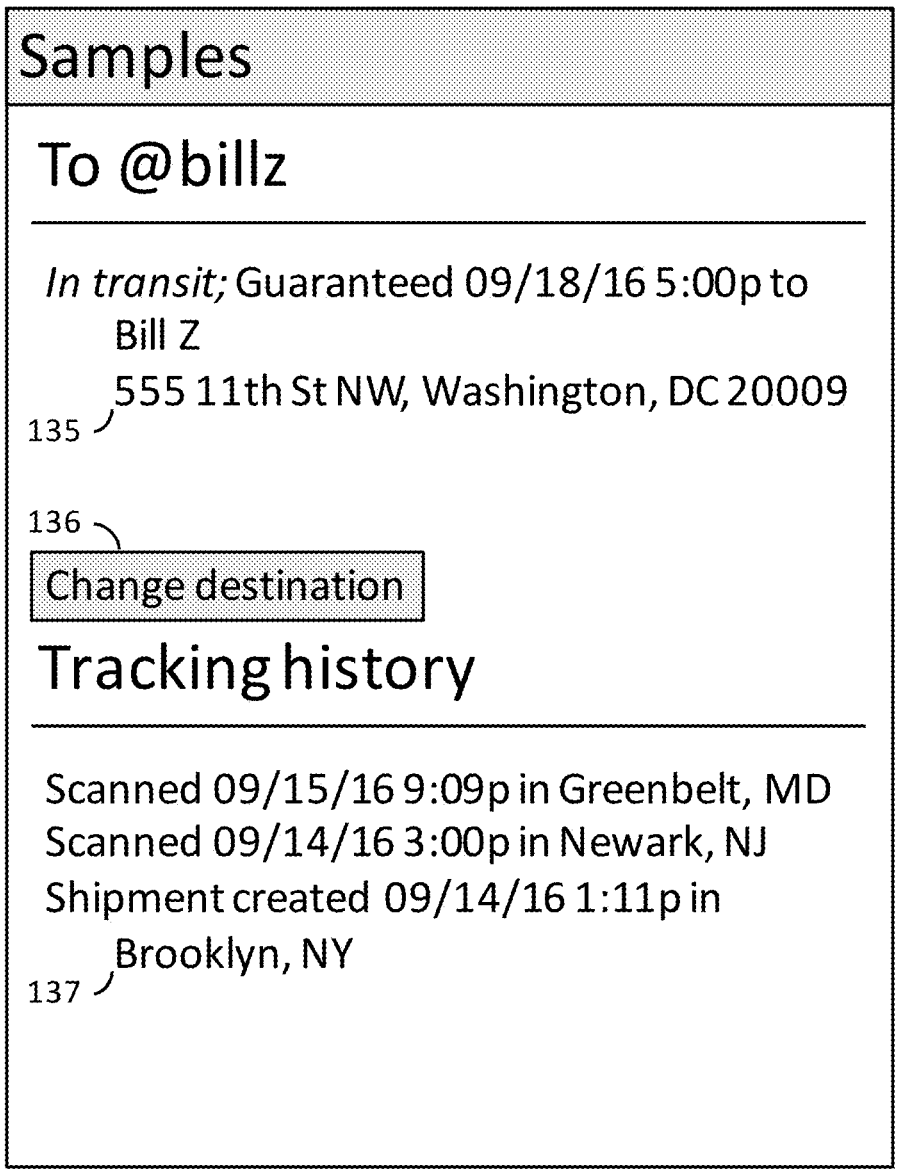
FIGS. 29a-29b are depictions of a screen corresponding to a shipment from the user seeing the screen (the user is a shipper); scrolling down from 29a one would see 29b.

In any event, the appropriate data is formatted and sent to user device software 17 to display in the appropriate buttons 113-116. Pressing one of the buttons will take the user to a screen corresponding to that shipment, the data for said screen preferably being requested from the server by user device software 17 at that time. (FIGS. 24 & 27-28 show exemplary screens corresponding to button 113 in FIG. 23, and FIGS. 29a-b show exemplary screens corresponding to button 115 in FIG. 23.) FIG. 24 shows a sample shipment detail screen for a package recipient who needs to choose a destination. The exemplary content corresponds to the content shown for button 113 in FIG. 23. Text 117 shows the status message from that button. Button 118 enables the user to choose the destination/pickup method, taking him or her to the screen corresponding to FIG. 25 below. Text 119 shows the scan history in reverse chronological order. In formatting text 119, the system preferably only includes the creation of the shipment and scans by scanners (not users). It only shows "Shipment created" (for the creation of the shipment), "Scanned" (for scans by scanners), and "Delivered" (for status codes 7-9—but this of course would not appear on a screen where the recipient needs to choose a destination). It displays this along with a formatted date/time and GPS coordinates translated to a city and state.

Figure 25:
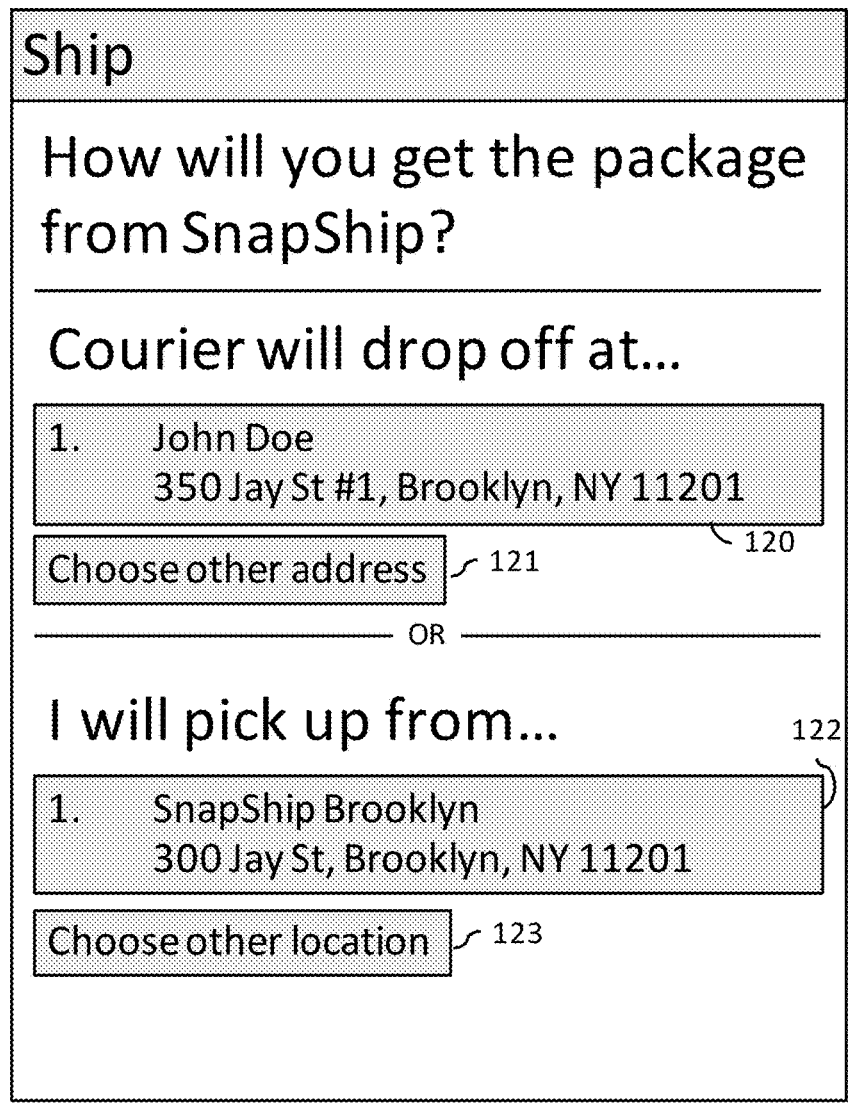
FIG. 25 is a depiction of a screen for a recipient to choose a package pickup method/address/location.

FIG. 25 depicts a screen for a recipient, using user device software 17, to select a courier dropoff address or a self pickup location/point. If a recipient is to be asked an address or a location as a result of the functionality described with respect to FIG. 18, he or she may access this screen from the "My shipments" screen discussed below. Note the screen shows both options, so that the recipient can change whether or not the shipment will use a courier to drop off to him or her. Any selections are sent to the server and recorded.

Button 120 displays the recipient's preferred address for courier delivery, if any (otherwise, it is not shown). Selecting it will record that as the destination address for the shipment. Button 121 reads "Choose other address" if button 120 is shown, otherwise, it reads "Choose address." In any event, it takes the user to a screen equivalent to that discussed with respect to FIG. 16, and the system records the address selected therewith. Both buttons 120 and 121 set the delivery to use a courier to drop off to the recipient. If there is an upcharge, the recipient is taken to the upcharge screen (see discussion below).

Button 122 displays the recipient's preferred locations for (self) pickup, if any (otherwise, it is not shown). Selecting one will record that as the destination location for the shipment. Button 123 reads "Choose other location" if button 122 is shown, otherwise, it reads "Choose location." In any event, it takes the user to a screen equivalent to that discussed with respect to FIG. 17, and the system records the location selected therewith. Both buttons 122 and 123 set the delivery to not use a courier to drop off to the recipient. If there is an upcharge, the recipient is taken to the upcharge screen (see discussion below).

As discussed above with respect to FIG. 15, if couriering is required or not offered, this screen would only display buttons 120/121 or 122/123 and accompanying text, as appropriate.

FIG. 26 depicts an exemplary screen shown if there is an upcharge after the shipper completes the original payment for the shipment. This may occur, for example, if the user changes the destination or pickup method, using, e.g., buttons 118, 128, 133, or 136 (in FIGS. 24, 27, 28, and 29*a* respectively). For example, the recipient added courier delivery to his or her address via the screens corresponding to FIGS. 24-25 after a package was shipped without it. After the user uses the screen corresponding to FIG. 25 to select the new destination/pickup method, the user is preferably taken to the extras screen (see discussion for FIG. 19 above) for any extras related to the new destination/pickup method (e.g., additional insurance), and then taken to the screen of FIG. 26 to pay for the upcharge.

Elements 124-126 function equivalently to elements 103-105 of FIG. 20, except that price breakdown 124 only shows upcharges and extras related to the new destination/pickup method. Once the user completes payment, the data is sent to the server and recorded and the user is returned to the shipment screen (e.g., FIGS. 24 and 27-29), updated with any changes. Note changing the destination results in a scan record and in embodiments with guaranteed delivery, recalculates the guaranteed delivery time. The upcharge price breakdown, payment method, and unique identifier of the user paying are appended to lists of each associated with the shipment.

FIG. 27 shows a sample shipment detail screen for a package recipient where the shipment is in transit. The exemplary content corresponds to the content shown for button 113 in FIG. 23 at a later time than FIG. 24. Text 127 now includes the status message as well as the destination (pickup) location/point. Button 128 enables the user to change the destination/pickup method, in a manner equivalent to button 118 in FIG. 24. This causes the package to be rerouted—the next time a package handler scans it the directions will correspond to a route from the current place the package is at to the new destination. Text 129 shows the scan history, as discussed above with respect to text 119 of FIG. 24.

FIG. 28 shows a sample shipment detail screen for a package recipient where the shipment is ready for self pickup at a pickup location. The exemplary content corresponds to the content shown for button 113 in FIG. 23 at a later time than FIG. 27. Text 130 now states that the package has been delivered. Text 131 indicates the package/locker number for pickup and the package/locker PIN for pickup. If the system is used with locations without lockers, the package number and package PIN may be, e.g., given to an employee at the pickup location to retrieve the package from a mailroom. In embodiments with lockers the PIN may be entered into a keypad a part of locker 5 to open it (lockers with these functions are known in the art, such as those referenced above). In addition, button 132 opens the locker automatically by sending a signal as discussed above for dropoff lockers.

If the package is to be couriered from the pickup location to the recipient, the package number and PIN are sent to the courier either (a) when they are generated, if courier delivery was selected in advance or (b) when courier delivery is added (e.g., as discussed with respect to FIG. 25). The courier can, if business rules so require, ask the recipient to repeat the PIN to confirm he or she is the intended recipient.

Button 133 enables the user to change the destination/pickup method, in a manner equivalent to button 118 in FIG. 24. In FIG. 28, the package has already been delivered to the pickup location; if the user changes to a new pickup location, this is recorded in the database record corresponding to the shipment. When the package handler scans the barcode to pickup packages from the dropoff locker, core software 10 checks the database to see whether any delivered packages need to be rerouted (the delivered-to location in the scan record does not match the destination location). In such a case, the package handler (scanner) is instructed to pick up the rerouted package(s) from their pickup locker(s) and preferably, a message is sent to the pickup locker(s) to open and the package/locker number and PIN of any such package(s) are displayed as a backup. If lockers are not used, preferably a barcode is still scanned to pickup packages, as discussed above. In such cases, the package number(s) and PIN(s) of any package(s) to be rerouted are displayed so, e.g., the mailroom can retrieve them. In the preferred embodiment, the PIN corresponding to a package is changed when it is so rerouted, to avoid a courier accidentally picking it up, and a message is sent to third party software 19 to cancel the pickup.

Text 134 shows the scan history, as discussed above with respect to text 119 of FIG. 24.

Figure 29A:
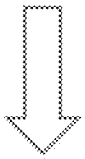
Figure 29B:
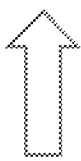

FIG. 29 shows a sample shipment detail screen for a package shipper. The exemplary content corresponds to the content shown for button 115 in FIG. 23. Text 135 shows the status message from that button. If the shipper selected the destination address or location (as appropriate to the pickup method), it is shown (as in FIG. 29*a*), otherwise, it is hidden. Button 136 enables the user to change the destination/pickup method, taking him or her to the screen corresponding to FIG. 18 above. However, there are preferably a pair of differences for a shipper using this button versus a recipient using the equivalent on the screens discussed above. First, once the shipper has selected courier delivery, he or she cannot change to self pickup (the option is missing from the screen corresponding to FIG. 17 and a message preferably states why). In such a case, button 136 preferably says "Change destination" instead of "Change destination/pickup method". Further, if the shipper selected courier delivery and the recipient chose the address, no changes can be made and button 126 preferably says "Cannot change destination" and is disabled.

Text 137 shows the scan history, as discussed above with respect to text 119 of FIG. 24.

If the user viewing a screen corresponding to FIG. 27*a* scrolled down, he or she would see a screen corresponding to FIG. 27*b*. Text 138 shows the price breakdown. Text 139 shows the payment information used. If a user paid upcharges, they will appear as additional screens below in a like manner (these will also appear for a recipient who pays upcharges, below FIGS. 24 & 27-28, for example).

Further Notes Regarding the Preferred Embodiment:

Notifications

When the shipper first completes payment, whenever he or she changes the destination, and whenever a package is delivered (to a dropoff location or by courier, as appropriate), the recipient is notified (preferably by app notification, as well as email or text notification if the recipient has selected the corresponding checkboxes in his or her settings—see checkboxes 40 and 42 in FIG. 6*a*). Selecting the app notification, or clicking a link preferably included in each email or text notification, takes the user to the shipment in "My shipments". There are known techniques in the art for accomplishing this. Shippers are notified when a package is delivered to its final destination in a like manner. Such notifications may be sent when an invitee of a user creates an account as well.

Check Prices and Availability

If the user selects the "Check prices and availability" button 34 in FIG. 5, the user is taken through a similar process as shipping a package. However, there area number of differences. First, there is a screen prior to that shown in FIG. 13. In this screen, the user is presented with a button describing each available packaging type (e.g., length, width, depth) from the database and can select one to skip FIG. 13. Alternately, the user can select a button labeled "Scan barcode" to proceed to FIG. 13. This enables the user to check prices and availability without having packaging on hand. Second, the screen corresponding to FIG. 14 has a "Skip" button which enables the user to proceed without entering a recipient. In such a case, the screen corresponding to FIG. 18 states, e.g., "How will the recipient get the package from SnapShip?" and the buttons are "Choose address" and "Choose location". Third, FIG. 20 only displays elements 104 and 105 if a barcode was scanned and a user was entered, in which case the text above them reads, e.g., "Ship today! How will you pay?" Otherwise, there is simply a button "Return to main menu" that returns the user to the main menu.

Payments to Third Parties

Core software 10 preferably may automatically make payments to third parties, e.g., couriers, according to known methods in the art.

API Exposure

User device API 12 may be exposed so that others can create variations on user device software 17. For example, businesses can create software that integrates with their systems and automatically creates shipments.

Ecommerce Integration

In some embodiments, third parties, for example, ecommerce websites, may ship on behalf of consumers. In this case, the shipper may provide some information in the "Ship" process above (e.g., the dropoff location and payment information) while the recipient provides other information (e.g., the pickup location), but it may be desirable to know both at ship time so the price may be determined. There are many known mechanisms for accomplishing this. For example, the ecommerce webpage or app the user is on may provide a link to user device 4 that launches the "Ship" process of user device software 17 (or user browser 18), with the shipper-provided information included (e.g., the relevant screens are skipped), and where the shipper would choose the destination, the screen corresponding to FIG. 25 is shown. The shipper and/or recipient-provided information may be encrypted by a public key that only core software 10 has the corresponding private key for; this way, a nefarious user cannot access it. One advantage of such a system is that the recipient's pickup information is hidden from the ecommerce merchant. The information sent to user device software 17/user browser 18 can also include payment information and payment requirements (e.g., a maximum price after which the user pays the difference, no payment for courier delivery pickup, or automatic payment for insurance). In such cases the user is informed that these are included for free and the screen corresponding to FIG. 20 only shows additional fees.

Automatic Labeling

Package sorting systems have been long known in the art. See, e.g., U.S. Pat. No. 4,832,204 to Handy et al.; U.S. Pat. No. 6,189,784 to Williams et al. Automatic label applying systems have also been long known. See, e.g., U.S. Pat. No. 3,989,574 to Evans; U.S. Pat. No. 5,238,099 to Schroeder et al. In some embodiments these are combined to create a scanning device 3 that corresponds to a sorting machine rather than a human and which prints human-readable labels on the packages when they are sorted. The machine readable code is scanned, and core software 10 provides the information to the label printer to be printed on the package (instead of, e.g., instructions on where to immediately take the package to as would be shown to a package handler). This information may include the delivery address and package number (future locker number, in these embodiments assigned at this time), although less information may be printed if privacy is desired. A hand scanner carried by a human sorter may also print out such a label. Machine readable code scanners that print labels are known in the art.

Incentives and Returns

In some embodiments, it may be useful to provide the user with incentives for picking up a package early. The package status screen may display a "bonus" if the user picks up the package within a certain window, e.g., a credit towards his or her next shipment depending on how soon he or she picks it up. Such incentives could depend on projected availability at the pickup location, according to thresholds set in the database. The system may also automatically reroute packages back to sender (e.g., the dropoff location/point a package left from) if they are not picked up after a specified time (this is an automatic destination change but handled just as if a user changed the destination).

The invention claimed is:

1. A method of shipping a parcel, the method comprising:
    obtaining, by a shipper party, a packaging, said packaging comprising a machine readable code, wherein said machine readable code represents data comprising a packaging identifier;
    electronically sending, by said shipper party, said data to a server;
    electronically sending, by said shipper party, a recipient account identifier corresponding to a recipient party to said server, wherein said server is configured to determine a destination address for said packaging based on said recipient account identifier corresponding to a recipient party and a default destination previously received by said server from said recipient party;

electronically receiving, from said server, a confirmation message indicating that said server was able to determine a destination for said packaging based on said recipient account identifier corresponding to a recipient party; and electronically sending, by said shipper party, payment information to said server.

2. The method of claim 1, the method further comprising:
electronically sending, by said shipper party, a request to said server to open a locker.

3. A method of shipping a parcel, the method comprising:
placing, by a manufacturer party, a machine readable code on a packaging, wherein said machine readable code represents data comprising a packaging identifier;

providing, by a distributor party, said packaging to a shipper party;

electronically receiving, by a carrier party, said packaging identifier from said shipper party;

electronically receiving, by said carrier party, a recipient account identifier corresponding to a recipient party from said recipient party;

electronically receiving, by said carrier party, a default destination from said recipient party;

electronically associating, by said carrier party, said recipient account identifier corresponding to a recipient party with said default destination from said recipient party;

electronically receiving, by said carrier party, said recipient account identifier corresponding to a recipient party from said shipper party;

electronically determining, by said carrier party, a destination address for said packaging based on matching said recipient account identifier corresponding to a recipient party received from said shipper party with said recipient account identifier corresponding to a recipient party received from said recipient party;

electronically sending, by said carrier party, a confirmation message indicating that said recipient account identifier corresponding to a recipient party received from said shipper party matched a recipient account identifier corresponding to a recipient party received from a recipient party;

physically receiving, by said carrier party, said packaging from said shipper party; and electronically associating, by said carrier party, said packaging identifier with said destination address.

4. The method of claim 3, wherein said packaging identifier is initially generated using a random number generation algorithm.

5. The method of claim 3, the method further comprising:
electronically receiving, by said carrier party, at a server of said carrier party, payment information from said recipient party; and electronically associating, by said carrier party, said packaging identifier with said payment information from said recipient party.

6. The method of claim 5, the method further comprising:
electronically receiving, by said carrier party, at a server of said carrier party, an additional destination from said recipient party; and electronically associating, by said carrier party, said packaging identifier with said additional destination from said recipient party.

7. The method of claim 6, the method further comprising:
electronically receiving, by said carrier party, a request to open a locker;

verifying, by said carrier party, that the sender of said request is authorized to access said locker; and electronically opening, by said carrier party, said locker.

8. The method of claim 7, wherein said data further comprises at least one of packaging length, width, and depth.

9. The method of claim 3, the method further comprising:
electronically receiving, by said carrier party, payment information from said shipping party; and electronically associating, by said carrier party, said packaging identifier with said payment information from said shipping party.

10. The method of claim 9, the method further comprising:
electronically receiving, by said carrier party, an additional destination from said shipping party; and electronically associating, by said carrier party, said packaging identifier with said additional destination from said shipping party.

11. The method of claim 3, wherein said recipient account identifier corresponding to a recipient party is a username.

12. The method of claim 3, wherein said recipient account identifier corresponding to a recipient party is an email address.

13. The method of claim 3, the method further comprising:
electronically receiving, by said carrier party, a destination from said shipping party; and verifying, by said carrier party, whether said destination from said shipping party matches said destination from said recipient party.

14. A method of shipping a parcel, the method comprising:
electronically receiving, from an ecommerce party, a request to open an ecommerce account;

creating an ecommerce account corresponding to said ecommerce party;

electronically receiving, from said ecommerce party, a first destination;

electronically receiving, from said ecommerce party, payment information;

electronically receiving, from a recipient party, a request to open a recipient account;

creating a recipient account corresponding to said recipient party;

electronically receiving, from said recipient party, a second destination;

electronically receiving, from said recipient party, a recipient account identifier;

electronically receiving, from said ecommerce party, a first transmission comprising a request to create a shipment and said recipient account identifier;

creating a shipment record corresponding to said request to create a shipment;

electronically associating said ecommerce account with said shipment record;

electronically verifying whether said first transmission's recipient account identifier is associated with a recipient account;

electronically determining said second destination based on said first transmission's recipient account identifier and said recipient account associated with said recipient account identifier;

electronically associating said second destination with said shipment record;

electronically associating a packaging identifier with said shipment record;
physically receiving, from said ecommerce party, a packaging comprising a machine readable code, wherein said machine readable code represents data comprising said packaging identifier;
electronically reading said data from said machine readable code of said packaging received from said ecommerce party and electronically determining whether said data's packaging identifier is associated with a shipment record;
electronically determining said second destination based on said data from said packaging received from said ecommerce party and said shipment record associated with said data's packaging identifier;
physically delivering said packaging to said second destination;
electronically receiving, from either said ecommerce party or said recipient, a second transmission comprising a request to return said packaging;
associating said request to return said packaging with said shipment record;
physically receiving, from said recipient party, said packaging;
electronically reading said data from said machine readable code of said packaging received from said recipient party and electronically determining whether said data's packaging identifier is associated with a shipment record;
electronically determining said first destination based on said data from said packaging received from said recipient party, said shipment record associated with said data's packaging identifier; said ecommerce account associated with said shipment record, and said request to return said packaging associated with said shipment record;
electronically associating said first destination with said shipment record; and
physically delivering said packaging to said first destination.

15. The method of claim 14, the method further comprising:
electronically billing a cost associated with delivery to the second destination using said payment information;
electronically receiving, from said recipient party, a second payment information; and
electronically billing a cost associated with delivery to the first destination using said second payment information.

16. The method of claim 14, the method further comprising:
electronically generating, in response to receiving said first transmission, said packaging identifier;
electronically sending said packaging identifier to said ecommerce party.

17. The method of claim 14, wherein said first transmission further comprises said packaging identifier.

18. The method of claim 17, wherein said packaging identifier is a packaging identifier not generated by the party receiving said transmission.

19. The method of claim 18, the method further comprising:
verifying, in response to receiving said first transmission, whether said packaging identifier not generated by the party receiving said transmission is associated with any previously created shipment records.

20. The method of claim 17, wherein said packaging identifier is a packaging identifier generated by said ecommerce party.

* * * * *